(12) United States Patent
Wason

(10) Patent No.: US 7,856,484 B2
(45) Date of Patent: Dec. 21, 2010

(54) WEB AND LOTUS NOTES ADAPTER LAYERS

(75) Inventor: James R. Wason, Tuxedo, NY (US)

(73) Assignee: International Business Machines Corporation, Armonk, NY (US)

( * ) Notice: Subject to any disclaimer, the term of this patent is extended or adjusted under 35 U.S.C. 154(b) by 874 days.

(21) Appl. No.: 11/487,187

(22) Filed: Jul. 14, 2006

(65) Prior Publication Data

US 2006/0259548 A1 Nov. 16, 2006

Related U.S. Application Data

(62) Division of application No. 10/157,262, filed on May 29, 2002, now Pat. No. 7,146,400.

(51) Int. Cl.
| | |
|---|---|
| G06F 15/16 | (2006.01) |
| G06F 15/167 | (2006.01) |
| G06F 3/00 | (2006.01) |
| H04W 4/00 | (2009.01) |

(52) U.S. Cl. .................. 709/218; 709/216; 709/223; 709/224; 709/227; 709/228; 370/328; 715/751

(58) Field of Classification Search ............. None
See application file for complete search history.

(56) References Cited

U.S. PATENT DOCUMENTS

| | | | | |
|---|---|---|---|---|
| 5,835,724 | A * | 11/1998 | Smith ........................ 709/227 |
| 6,175,832 | B1 * | 1/2001 | Luzzi et al. ................. 707/10 |
| 6,272,127 | B1 * | 8/2001 | Golden et al. ............. 370/352 |
| 6,336,115 | B1 * | 1/2002 | Tominaga et al. ............ 707/10 |
| 6,397,253 | B1 * | 5/2002 | Quinlan et al. ............ 709/227 |
| 6,557,039 | B1 * | 4/2003 | Leong et al. ............... 709/229 |
| 6,738,756 | B1 * | 5/2004 | Brown et al. .................. 707/2 |
| 6,880,922 | B2 | 4/2005 | Silverbrook |
| 6,915,354 | B1 * | 7/2005 | Ozdemir et al. ............... 710/5 |
| 6,938,260 | B1 | 8/2005 | Wason |
| 7,003,574 | B1 * | 2/2006 | Bahl ........................ 709/228 |
| 7,039,709 | B1 * | 5/2006 | Beadle et al. .............. 709/227 |
| 7,089,281 | B1 * | 8/2006 | Kazemi et al. ............. 709/203 |
| 7,103,714 | B1 * | 9/2006 | Jacobs et al. ............... 711/113 |
| 7,133,891 | B1 * | 11/2006 | Uceda-Sosa et al. ........ 709/203 |
| 7,188,176 | B1 * | 3/2007 | Nedderman et al. ......... 709/227 |

(Continued)

Primary Examiner—Ario Etienne
Assistant Examiner—Ho Shiu
(74) Attorney, Agent, or Firm—Scully, Scott, Murphy & Presser, P.C.; Anna Linne, Esq.

(57) ABSTRACT

An adapter layer architecture that provides a consistent protocol for interactions between client and server side code. The architecture, which is particularly well suited for an enterprise application development platform (EADP), isolates what function operates at what side of the request ("client" and "server"). The preferred embodiment of the invention provides a number of specific features. These include: 1. a uniform mechanism to pass data between client and server; 2. a server side mechanism to handle client requests; 3. a client side request handler; 4. a mechanism to provide interactive conversational sessions, with each client session able to maintain multiple concurrent conversations; 5. a mechanism to purge sessions; and 6. unit of work control. In addition, the adapter layer architecture of the invention allows some adjustment in practice for various implementations to meet the adapter requirements. As new external sources (for example MQ series) are encountered, they can be mapped to the adapter architecture and incorporated into EADP functions.

20 Claims, 22 Drawing Sheets

U.S. PATENT DOCUMENTS

| | | | |
|---|---|---|---|
| 7,188,181 B1 * | 3/2007 | Squier et al. | 709/228 |
| 7,197,547 B1 * | 3/2007 | Miller et al. | 709/223 |
| 7,234,112 B1 * | 6/2007 | Brown et al. | 715/713 |
| 7,249,377 B1 * | 7/2007 | Lita et al. | 726/12 |
| 7,260,644 B1 * | 8/2007 | Shah et al. | 709/238 |
| 7,272,640 B1 * | 9/2007 | Kazemi et al. | 709/218 |
| 7,406,523 B1 * | 7/2008 | Kruy et al. | 709/227 |
| 2001/0039586 A1 * | 11/2001 | Primak et al. | 709/228 |
| 2001/0054020 A1 * | 12/2001 | Barth et al. | 705/37 |
| 2002/0073208 A1 * | 6/2002 | Wilcock et al. | 709/227 |
| 2002/0085029 A1 * | 7/2002 | Ghani | 345/751 |
| 2002/0143663 A1 | 10/2002 | Wilcock et al. | |
| 2002/0144233 A1 * | 10/2002 | Chong et al. | 717/105 |
| 2002/0176377 A1 * | 11/2002 | Hamilton | 370/328 |
| 2003/0016819 A1 * | 1/2003 | Cheng | 380/2 |
| 2003/0023702 A1 * | 1/2003 | Kokku et al. | 709/216 |
| 2003/0088788 A1 * | 5/2003 | Yang | 713/201 |
| 2004/0024880 A1 * | 2/2004 | Elving et al. | 709/227 |
| 2004/0093405 A1 * | 5/2004 | 't Hooft et al. | 709/224 |

* cited by examiner

WEB AND LOTUS NOTES ADAPTER LAYERS

CROSS REFERENCE TO CO-PENDING APPLICATION

This application is a divisional of U.S. application Ser. No. 10/157,262, filed May 29, 2002 now U.S. Pat. No. 7,146,400.

BACKGROUND OF THE INVENTION

1. Field of the Invention

This invention generally relates to the operation of distributed processing computer systems. More specifically, the invention relates to an adapter layer architecture that provides a consistent protocol for interactions between clients and servers in a distributed processing system.

2. Background Art

A distributed processing environment includes two or more processing nodes connected by a communications link, i.e., a network. At each processing node, there may be at least one processor, and any assortment of memory devices, storage devices, and input/output devices such as keyboards, displays, etc. The advantages of a distributed processing system include being able to utilize the resources (e.g., files, applications, tools, storage, etc.) resident at another node in the network. However, difficulties arise in trying to utilize and take advantage of these resources in a distributed environment.

One of these difficulties is the consistent distribution of function between client and server. Another difficulty is that there are multiple client and server environments that are in common use. The "client" may be a Lotus Notes client, a Web browser, or a transaction interface. The "server" may be a Lotus Notes server, a servlet server such as WebSphere, or a custom application polling for requests. A third problem is giving the client session conversational ability. This requires storing state data on the client, the server, or both. Related to this is the problem of how to optimize resumption of that conversation at the next client request to the server. The client may have one or more prolonged interactions with the server which then have to result in a save or rollback. This requires unit of work management to isolate these changes and to understand how to update all of them at once.

SUMMARY OF THE INVENTION

An object of the present invention is to provide a consistent protocol for interactions between client and server side code in a distributed processing system.

Another object of this invention is to provide an adapter layer architecture for an enterprise application development platform that isolates what function operates at what side of a request ("client" and "server"), and allows some adjustment in practice for various implementations.

A further object of the invention is to provide a uniform mechanism to pass data between clients and servers of a distributed processing system.

Another object of this invention is to provide a server side mechanism to handle client requests in a distributed processing system.

A further object of the invention is to provide, in a distributed processing system, a client side request handler that interprets user interactions and generates request documents in response thereto.

An object of the invention is to provide a procedure to purge servers, in a distributed processing system, of inactive sessions.

A further object of this invention is to provide a single unit of work, in a distributed processing system, that allows updates to be made in the same way over a series of interactions.

These and other objectives are attained with an adapter layer architecture embodying this invention. This architecture, which is particularly well suited for an enterprise application development platform (EADP), provides a consistent protocol for interactions between client and server side code, and the architecture isolates what function operates at what side of the request ("client" and "server"). The preferred embodiment of the invention provides a number of specific features. These include: 1. a uniform mechanism to pass data between client and server, 2. a server side mechanism to handle client requests; 3. a client side request handler, 4. a mechanism to provide interactive conversational sessions, with each client session able to maintain multiple concurrent conversations; 5. a mechanism to purge sessions; and 6. unit of work control. In addition, the adapter layer architecture of the invention allows some adjustment in practice for various implementations to meet the adapter requirements. As new external sources (for example MQ series) are encountered, they can be mapped to the adapter architecture and incorporated into EADP functions.

The preferred adapter layer support of this invention may be provided within the context of the Enterprise Application Development Platform, discussed in U.S. patent applications No. 09/616,800, filed Jul. 14, 2000, now U.S. Pat. No. 6,880,922, issued Feb. 1, 2005; 09/616,809, filed Jul. 14, 2000; 09/615,973, filed Jul. 14, 2000; and 09/615,976, filed Jul. 14, 2000, now U.S. Pat. No. 6,938,260, issued Aug. 30, 2005, the disclosure of which are incorporated herein by reference. The ability of the EADP data manager class (the EADPDAManager) to maintain state information through a series of complex interactions is exploited to provide optimized conversational capabilities.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
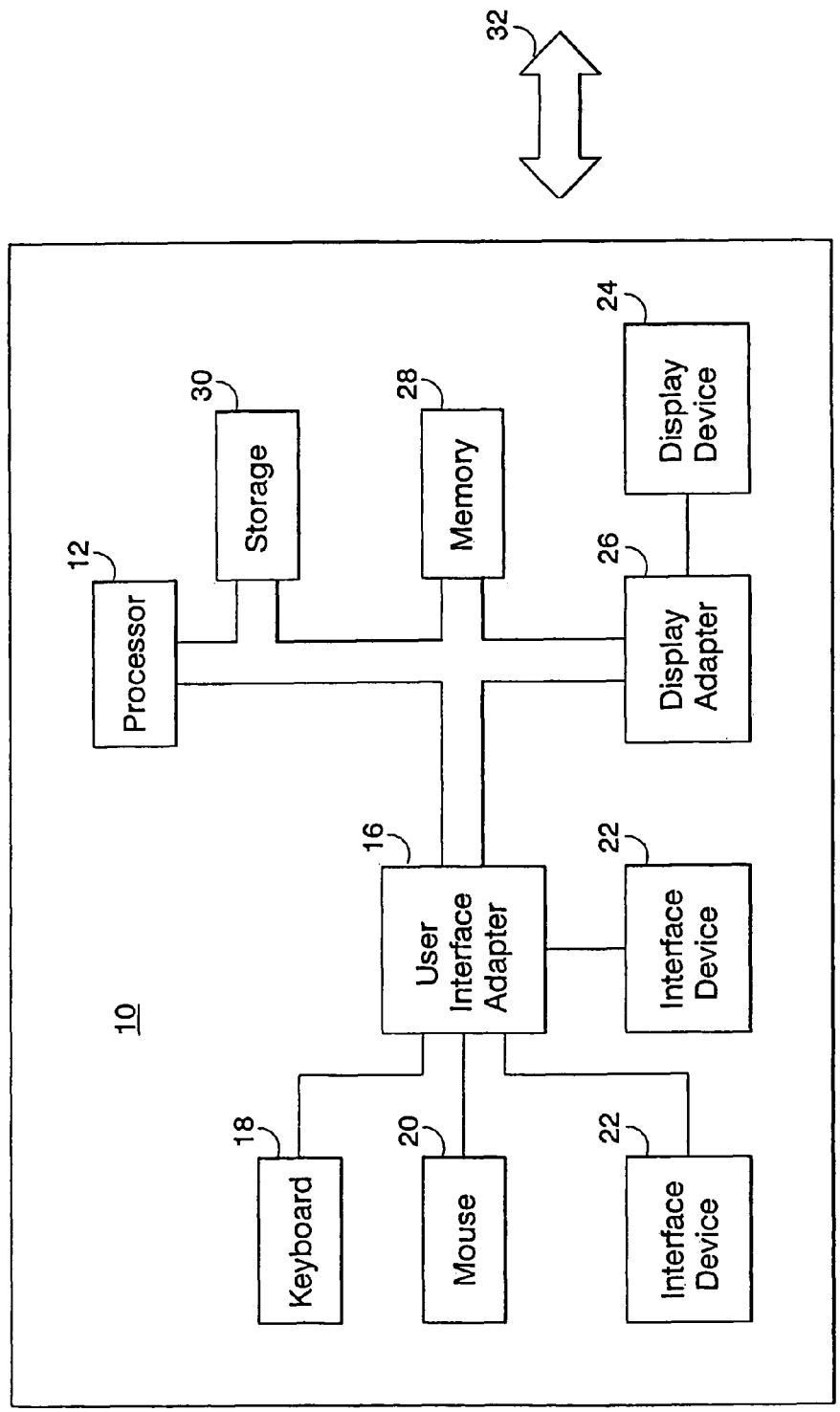
FIG. 1 is a bock diagram of a computer workstation environment in which the present invention may be practiced.

FIG. 1 illustrates a representative workstation hardware environment in which the present invention may be practiced. This environment of FIG. 2 comprises a representative single user computer workstation 10, such as a personal computer, including related peripheral devices. The workstation includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
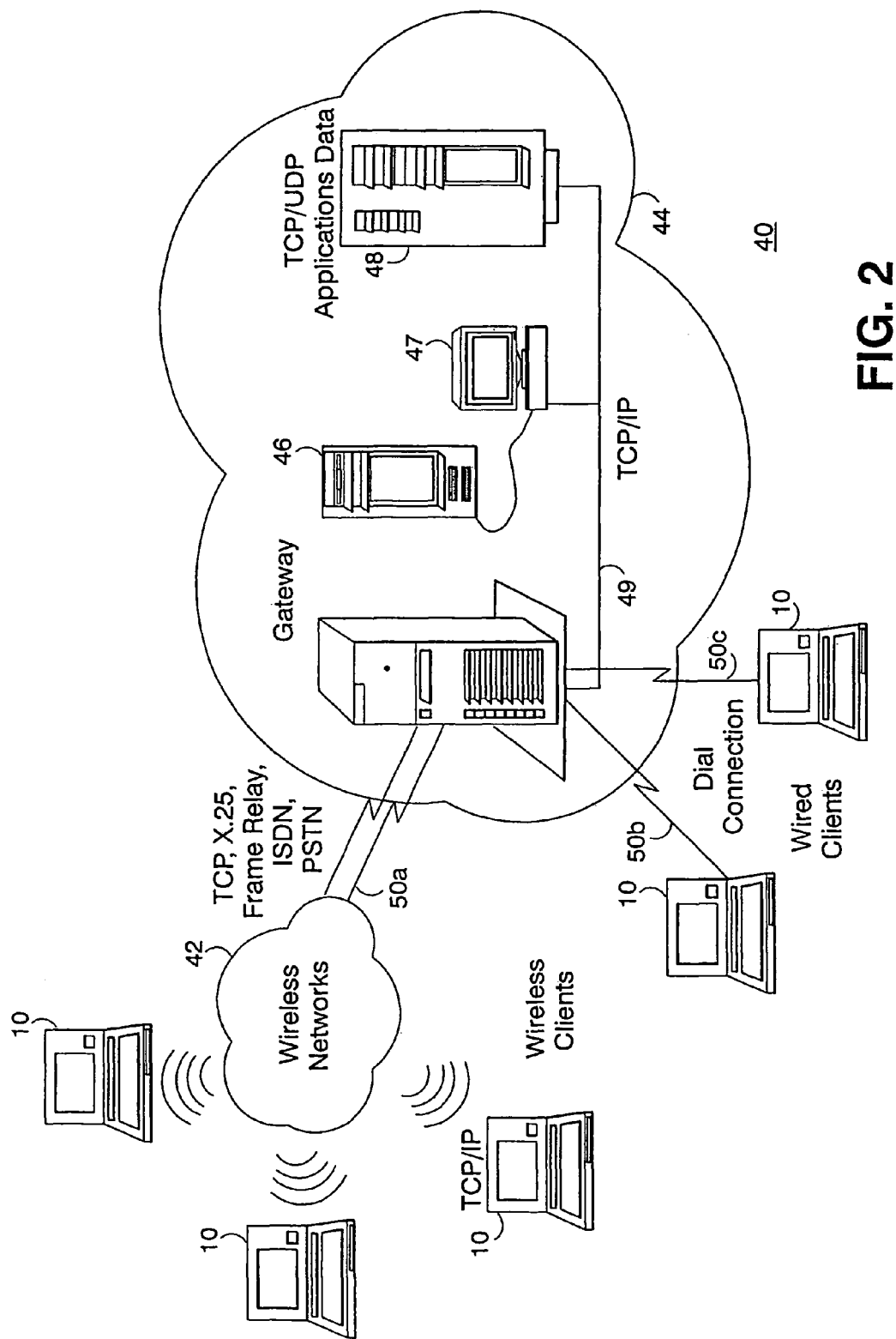
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs (not shown) may be included, where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 342 by means of a communications link 50a. The gateway 46 may also be directly coupled to one or more workstations 10 using a communications link 50b, 50c. The gateway computer 46 may be implemented utilizing an Enterprise Systems Architecture/370 available from the International Business Machines Corporation ("IBM"), an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

As mentioned above, difficulties arise in trying to utilize fully and take advantage of the resources of a distributed processing system. In accordance with the present invention, a number of features are provided to address these difficulties. These features include: 1. a uniform mechanism to pass data between client and server, 2. a server side mechanism to handle client requests; 3. a client side request handler; 4. a mechanism to provide interactive conversational sessions, with each client session able to maintain multiple concurrent conversations; 5. a mechanism to purge sessions; and 6. unit of work control. Each of these features is discussed below.

A Uniform Mechanism to Pass Data Between Client and Server.

A request document will contain information for the type of action the server side is to perform. The document includes a session key (to locate the correct server session), a requested action, and optionally information about the type of table to process, or the data manager currently in use, and key information. Based on the type of request, additional data from the client side such as the columns to be displayed, the number of rows to be fetched, etc, may be included. The request document is generated by the client side, and is processed by the server. Any results (such as data filled in as the result of a database query) are added to the request document, which is then passed back to the client.

A Server Side Mechanism to Handle Client Requests.

This mechanism is comprised of two pieces. First, a mechanism to locate pending requests, and second, a session class that handles the request. The request handling examines the request type (e.g. open list, open row, open subobject, scroll, commit) and calls the appropriate method to process that request. The method then uses additional data from the request document to handle the request.

A Client Side Request Handler.

The client side interprets user interactions and generates a request document (for example to scroll down a list). It then responds to the returned request and presents data back to the user.

A Mechanism to Provide Interactive Conversational Sessions, with Each Client Session Able to Maintain Multiple Concurrent Conversations.

A user session is identified by a session key, which is passed in the request document and is used on the server side to create or find a session. Subsequent requests with the same session key are passed to that session. Within the session, requests related to a particular set of data managed by a data manager (an instance of EADPDAManager) are kept together by placing a manager key in the request document. This manager key is assigned to the request document on the server when that manager is first created, and is passed back in by the client for the next request relating to that manager. For example, an "open list" request would pass the manager type into the server (for example, orders). The request handler would create a new data manager for the list of orders and place its manager key in the request document. The same key is used to store the data manager in a dictionary within the server session class.

The next request for that manager (for example "scroll list") would pass the same manager key back in. The key is used on the server side to retrieve the manager, which has all the information within it needed to process the scroll request. This mechanism lets the server maintain long running conversational sessions with the client which can handle complex interactions such as scrolling, drill down, tabular update, and selection of quick view data. The client maintains a list (the "window list") of its conversational sessions with the server, and can flip quickly from one to another, and resume each conversation with no loss of state information. For the servlet implementation, the use of the "back" and "forward" buttons to move to another client page are also fully supported. Also, state data for the clients can been spread across a clustered WebSphere server environment if persistent sessions are used.

A Mechanism to Purge Sessions.

One result of providing server side sessions is that eventually they may consume all of the server resources. For the Lotus Notes implementation, a fixed number of sessions are allocated for the server. When that limit is exceeded, a check is made for inactive sessions. The most inactive session (assuming it exceeds the threshold) is discarded. Servlet servers typically have a mechanism to discard inactive http sessions. This results in the disposal of the associated EADP session. When a session is discarded, there is code in the finalize methods of the session and the associated data managers to make sure that all resources get garbage collected.

Unit of Work Control.

One aspect of a conversational session is that updates can be made over a series of interactions (for example, on several pages of a list panel that has been scrolled). All of these are controlled in a single unit of work, and committed or rolled back together. This takes into account the fact that the client may be maintaining several sessions, and in the case of the Web client, the server environment may be clustered so that the various interactions building up the unit of work may take place of different servers.

The adapter architecture described above has implementations for Lotus Notes and for Java Servlets. These are described below in parallel for the various aspects of the invention.

The Request Document

For the Lotus Notes implementation, this is simply a Notes document. For compatibility in the Java servlet implementation, a new Java class, the EADPDocument is introduced. This stores its fields in a dictionary, and may provide many of the same methods (getItemValue, hasItem, replaceItemValue, etc.) as the Notes Document class.

The request document is used as a consistent mechanism to pass information from client to server and back to client. The structure of the Lotus Notes document, and its equivalent for the servlet implementation, is flexible enough to be able to handle a variety of data types, and to allow dynamic definition of what fields are included in the request.

There are several fields which are used consistently for all requests and which provide the framework for adding other fields:

Request Type

This field (the ReqAction) acts like a function code when passed from the client. It is used to indicate to the server what to do with the request document. Each request type invokes functionality available within EADP.

Session Key

The session key is used to return back to the same server session from multiple client requests. The server assigns a session key (and an associated session) to each new client, and passes this field back in the request document. This is then saved at the client side and returned with the next request.

Manager Key

The conversational processing available within an EADP client server interaction includes many actions which go back to the same data manager. This includes scrolling of lists, tabular update, processing updates to quick view data, and drill down. When a request such as OpenList opens a new manager, its key is assigned to the request document by the server and passed back to the client. The client then keeps track of which of its available windows is attached to which manager, and passes back the key for that manager for a request from that window. This technique allows the client to handle multiple interactions with the server at the same time.

Display Columns

These are the internal names of the columns to be returned for a particular request. This can be determined at the client side. They are passed in as a vector of strings (each string is an internal column name for the column to be displayed) with the item name of displayCols. If the displayCols field is not included in the request document passed in the client, it is filled in by the server on first request (for example an OpenList request) based on defaults or customizations made within EADP. There is a customizable field displayCols in EADP-DAManager (this is an array of strings) that is used for this purpose.

Page Rows and Page Columns

Each displayed page on the client side represents a scrollable window on the total data. The pageRows and pageCols fields indicate how many rows and columns are to be displayed on each page.

Sticky Columns

When columns are scrolled, this field determines how many of the left most columns (used for row identification) remain visible.

Page Number and Line Number

The page number is set by the client to determine which of the available scrollable pages should be shown (for list display). The line number is associated to each entry in the list. It is passed with requests such as Open Row or Drill Down which require knowing which entry in a list needs to be processed for the next request. The calculation of position in the total list requires knowing the page number, the number of rows per page, and the "current" line number.

When a request is made to drill down or do quick view selection, the location of the originating row within its manager is passed as "parent" fields (ParentPageNumber, ParentLineNumber, and ParentPageRows).

One feature that is supported is quick view selection (for example, selecting a customer from a list of customers as the customer for an order that is displayed in a list of orders). Because of a restriction in the way the Lotus Notes implementation handles fields with the same name, the fields for the selection list are all prefixed with SEL_ (this includes the external column names and column values described below).

External Column Names

These are placed in the request document by the server when a request is processed. The field name for each external column name is ColTitle_1, ColTitle_2, etc, where the suffix matches the index (one based) of the display column.

Column Values

For list requests, these are passed as COL_i_j, where i is the line number and j is the column number. For requests related to just one entry, these are passed as COL_j, where j is the column number. These entries can be placed in the request document by the server (to fill in data for an open or scroll request), or by the client when data is updated at the client side.

The data placed in the COL field on the server side includes a list of three values. The first is a string value which represents the value for the data element (the result of getStringValue for the column name for the row). The second is the internal name of the column, which is used for client side processing. The third is a list of the permitted values for the column, if it has discrete values.

A Server Side Request Handler.

The line that EADP draws between "server" and "client" side processing does not exactly match the break for a particular implementation. For the servlet implementation, some of the "client" side processing actually takes place on the server.

The responsibility of the server side is to initiate a global server session, maintain client sessions, maintain manager sessions within the client sessions, and handle client requests. The server side also needs to clean up unused resources as client sessions expire.

The Monitor Class

The monitor class maintains the global session data for a server instance. It establishes a connection with the relational database, and for the Lotus Notes implementation it maintains the connection with the Lotus Notes server that holds the request documents. The monitor class for a particular application is a child of the Lotus Notes or Web EADP Monitor class (NotesEADPMonitorClass or EADPServletMonitor). This child is customized with the database definition class for the application (a child of EADPDatabaseDefinition) and in the case of the Lotus Notes monitor, the location of the Lotus Notes server.

Figure 3:
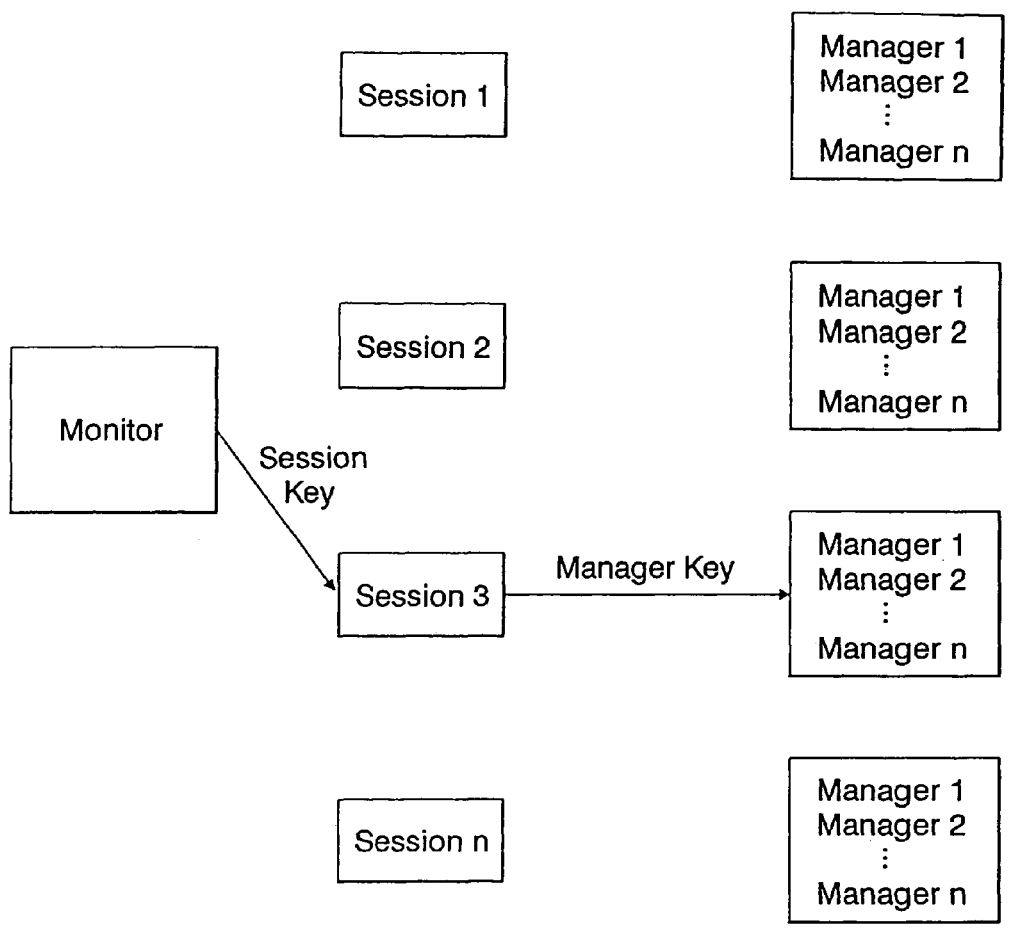
FIG. 3 illustrates the operation of a monitor class in the adapter layer support of the present invention.

In the Lotus Notes implementation, the Java code for the monitor class runs as a Java application. When the monitor initializes, it creates the connections and begins a thread to poll for request documents on the Lotus Notes server. The monitor class is customized for each application to point to the correct relational and Lotus Notes databases. With reference to FIG. 3, as each request comes in, the monitor class checks if there is a session already associated to that request (it keeps a dictionary of the active sessions keyed by the session key). If one does not exist, it creates a new instance of the session class, adds it to the session dictionary, and places the session key in the request document. In either case, it passes the request document to the session class for processing.

The monitor class is also responsible for server housekeeping functions. One request type that can come in is to stop the server. When this request arrives, the monitor will shut down all threads for the sessions and terminate its polling thread.

For the Java implementation, much of the housekeeping work for the server will be done by the servlet server (for example, by WebSphere). The monitor class has a reduced role; it is still used to establish connection to the relational database (it contains an instance of the database definition class for the application which is activated with the monitor). The monitor runs as a singleton in the servlet server, and it is created by the first http request to an EADP servlet. In order to get around the restriction in Java that class attributes cannot be redefined by children, the EADPServletMonitor class has a "singleton table" class attribute to store the singleton for the application monitor. When the singleton for the application monitor is created and added to this table, the datastore for its database definition class is also activated.

Although it is possible to store the servlet session classes within the monitor, it is more efficient in clustered environments to store them in the http session, so that they can be serialized as a part of the persistent session. Since the session class may be rematerialized on a different server, the role of the monitor is to maintain global state data that is unique to a server but not to a session.

The EADPServletForm

The EADPServletForm has logic in its doGet method which provides a bridge between functions provided by the servlet server and the architecture of the EADP adapter layers. The servlet server is polling for http requests; in response to these it invokes the doPost or doGet method on the servlet (in the EADPServletForm the doPost method just calls doGet). The doGet method converts the information in the http request into an EADP request document format. It creates the singleton for the monitor class if it does not exist, creates or finds an instance of the session class based on the session key in the request document, assigns the monitor to the session (this is important in a clustered environment to make sure that the session class uses resources on the proper server) and calls the session class to process the request. It then does some "client" post processing which will be described below.

The Session Class

The session class is invoked to handle each request. It is assigned the request document (and also global information such as the monitor and the database definition) and its handleRequest method is called. The handleRequest method examines the ReqAction in the request document and calls the appropriate method on the session class to handle that request (it operates as a switch to map the request to an implementing method). There are handleBefore and handleAfter methods which are called by handleRequest (as the names suggest, before and after its own handling); these can be redefined to handle additional request types. The monitor class acts as a factory class to create instances of the session class, and its children can be customized to create children of the base session classes.

Discussed below are some representative actions that are handled:

Open List

Figure 4:
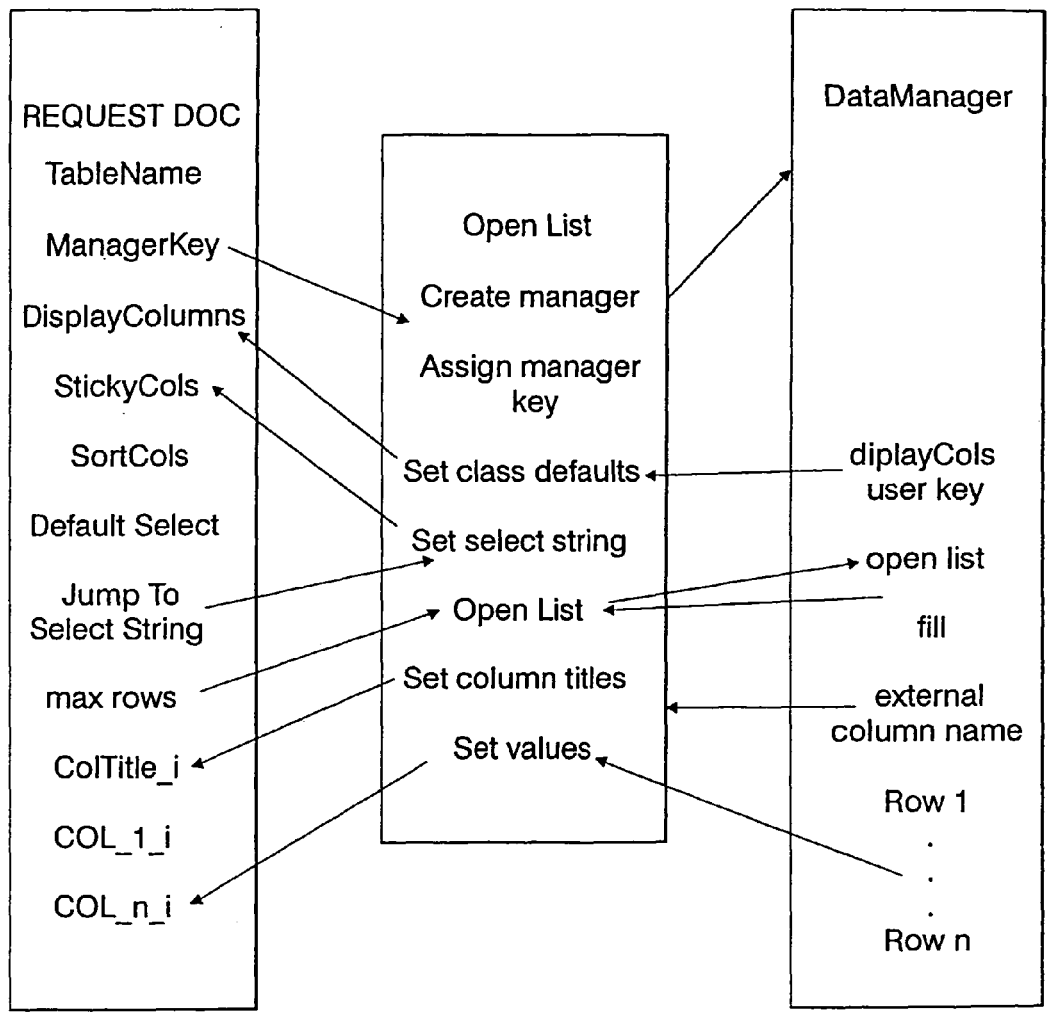
FIG. 4 represents an OpenList method that may be used in the adapter layer support.
Figure 5:
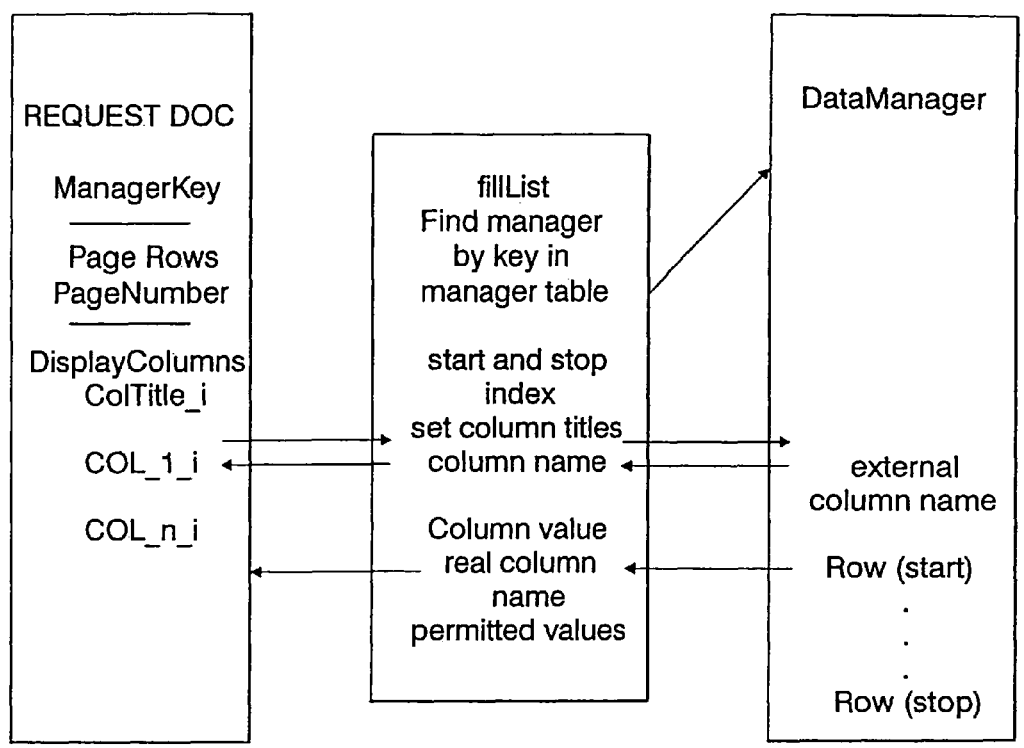
FIG. 5 represents a fill list method

The Open List action, represented in FIG. 4, is the most typical initial interaction with a session. The "OpenList" request calls the open method. The request document must carry the type of manager to open (the type of table), and the session key to establish contact with the session class. Optionally, the request document may carry the number of rows and columns per page, the display columns, the number of sticky columns, sort columns, and selection criteria. In some cases the manager key for an existing manager may also be passed in the request document. If the manager key is not provided, a new manager for the correct type is created, using the data definition class for the application as a factory class to create an application class for the table and then accessing that application class's manager (this is the base EADP function, the only addition here is the passing of the application class name in the request document).

If display columns are not explicitly passed in the request document they are determined from the manager. It displayCols property can be customized to give the display columns, and this is the most typical way of determining those columns. However, in some cases the invoking list panel on the client side may have its own customizations that override the base display columns. The default for the display columns is to have the "key" column as the first column, and to have the number of sticky columns set to one (this being the "key" column). The default for the key column is the first database key column; however, in some cases, this is an artificial key (such as a document unique id) with no meaning to the user. EADP allows a "user key" column to be defined as a part of the EADPDAManager customization. If this has been done, this column is regarded as the key column and is placed first.

If sort columns are specified in the request document, they are moved to be ahead of the other display columns.

As its name implies, the openList command opens and displays a list of entries, based on selection criteria passed in the request document. For top level objects, it builds a selection string from the selection criteria and passes this to the open method on the EADPDAManager. Before doing this it also assigns the jumpTo and defaultSelectString attributes which are used to modify the selection. It then calls the fill method, passing the number of rows per page as the number of rows to fill in.

FillList

Figure 6:
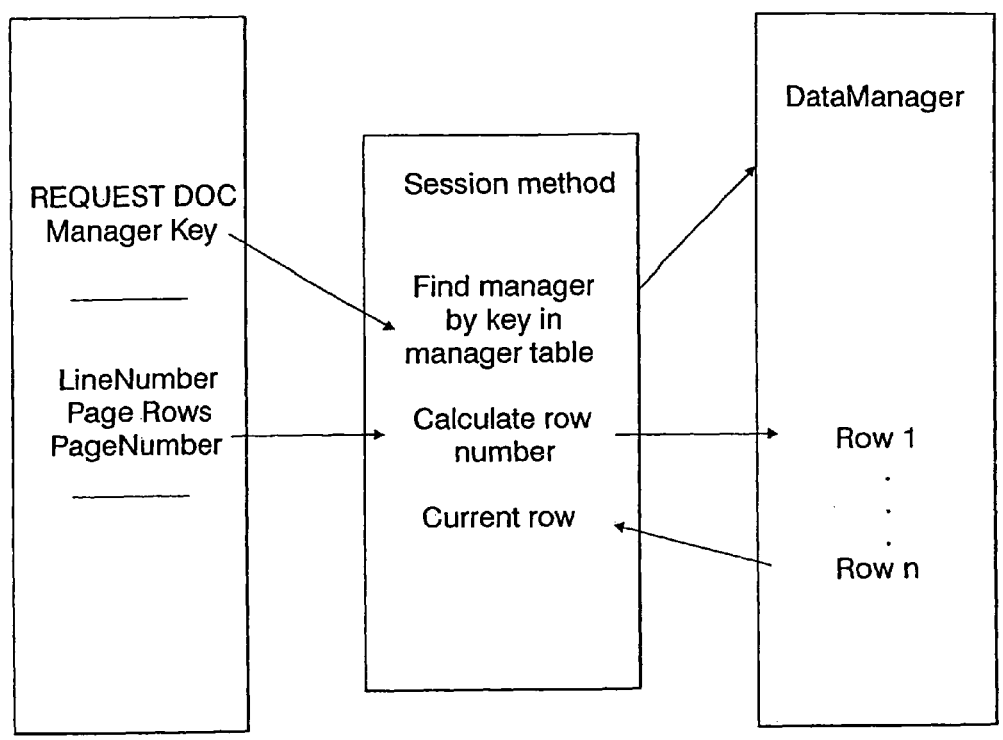
FIG. 6 illustrates a session method.

With reference to FIG. 6, the FillList technique is used by methods that need to find the "current" row for further processing. The request document contains the managerKey. It is assumed that the manager already has the requested "current" row in its items list from a previous interaction (such as openList). The manager key is used to locate the manager in the session manager table. The line number, page number and rows per page are passed in the request document. These are used to calculate the index of the current row in the item list, and that row is accessed by the session method.

openSubList

Figure 7:
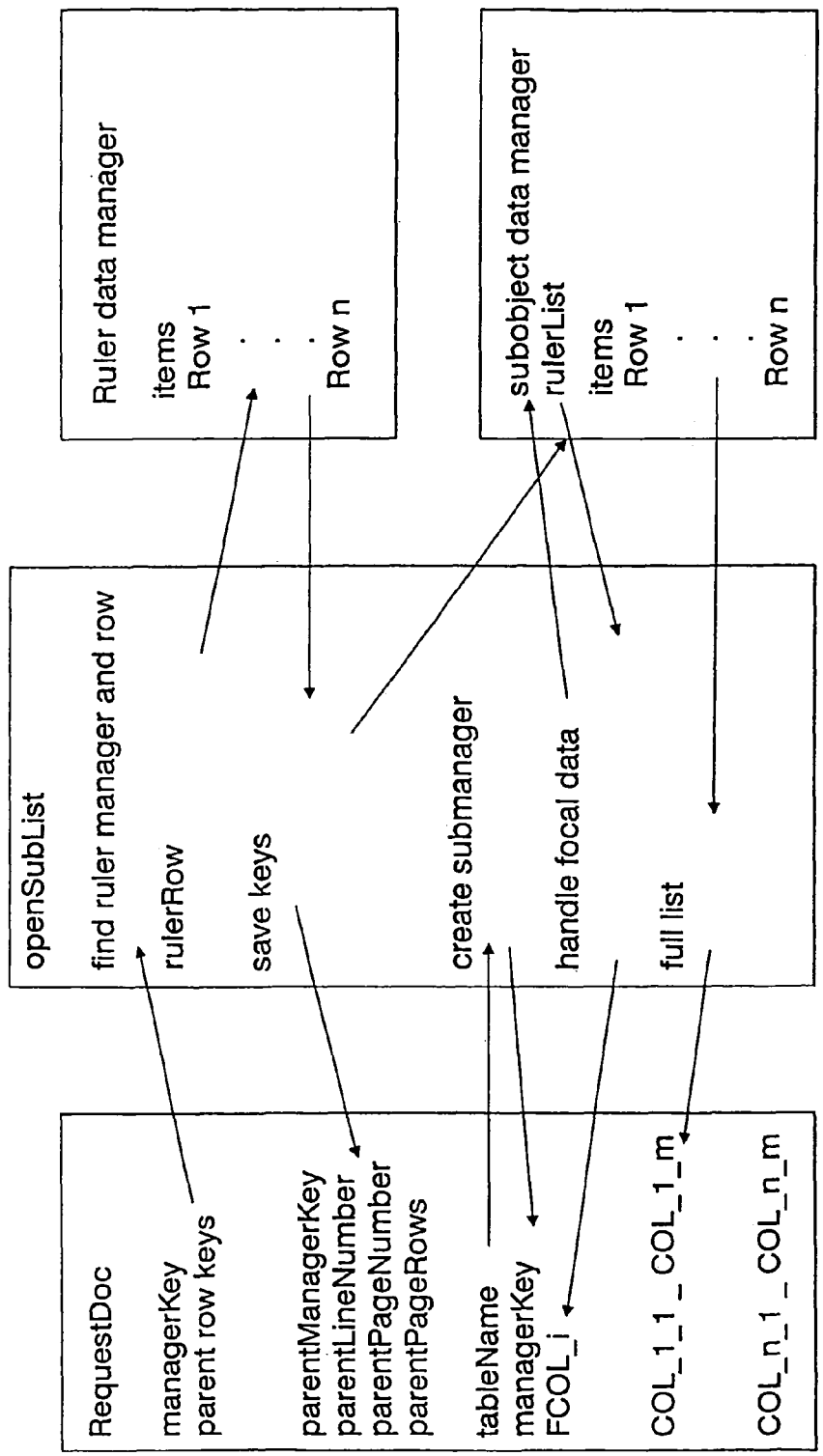
FIG. 7 represents an openSublist action that may be used in the adapter layer support.

With reference to FIG. 7, the OpenSubList request invokes the OpenSubList method, which is used to drill down to a subobject list for a selected row from the list of ruler objects. The ruler row is obtained from the manager key, line number, page number and page rows as described above. These are placed back in the request document in item names prefixed with "Parent" to be saved on the client side for subsequent request (and this method will check first to see of there is a "parent" version of the information in the request documents).

Once the ruler row is obtained, it and the class name for the subobject (passed as the tableName in the request document) are used as parameters to the subManager method on the parent manager. This base EADP method uses the data definition class as a factory class to create an application class of the correct type (based on the class name) and it assigns a ruler list to it based on the ruler list of the ruler, manager, with the ruler row added (note that this technique allows drill down into lower layers of the complex object structure.)

The ruler list of the submanager is then used to set up focal data information in the request document.

The request document can specify which focal columns to fill in.

The items list for the submanager is opened (this is a base EADP function which uses the ruler to subobject relationship from the ruler row to its subobjects within the submanager table to fill the items list for the submanager). The prepared submanager is then passed to fillList, which adds the column titles and column cell information to the request document.

OpenUsageList

Figure 8:
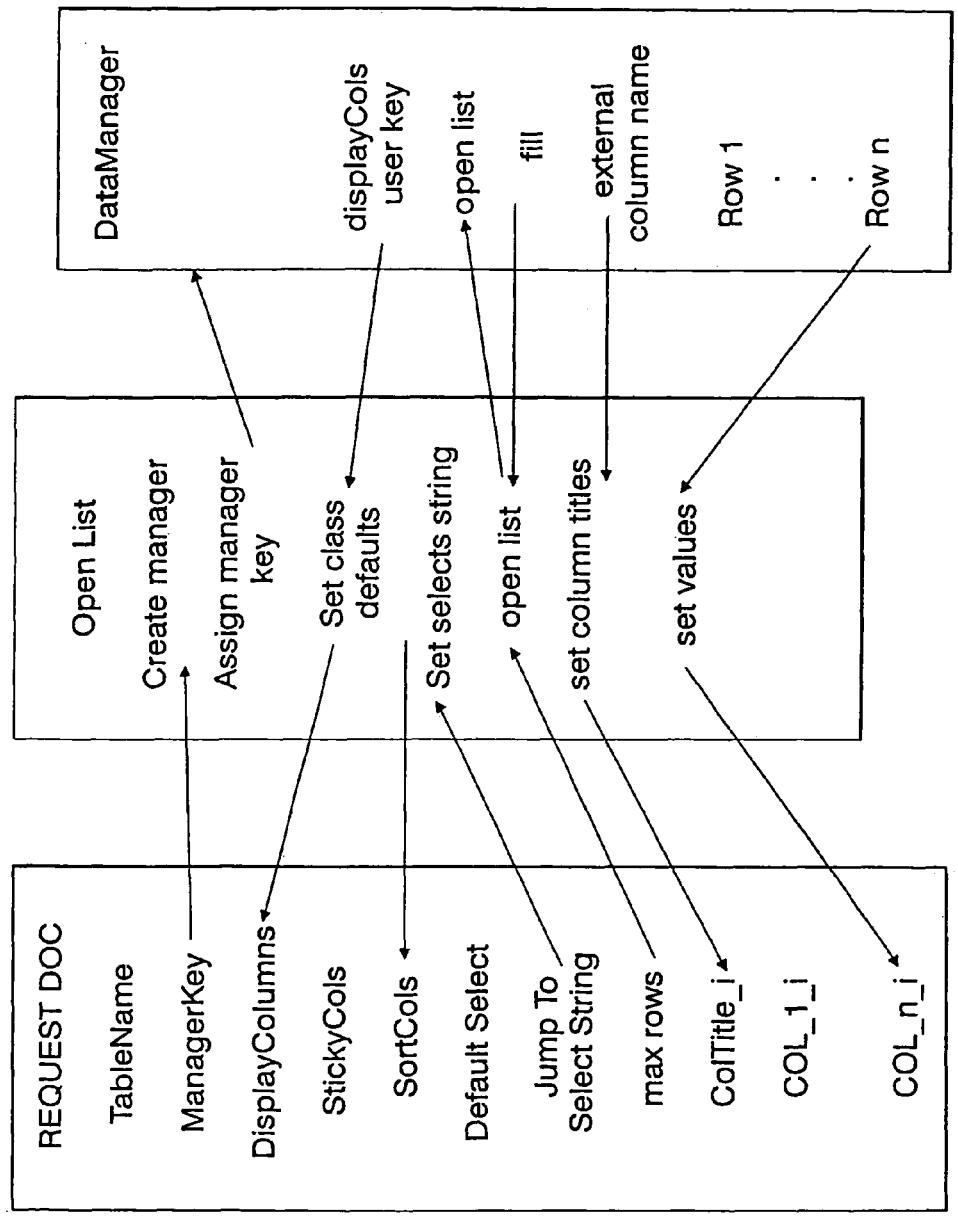
FIG. 8 represents an open UsageList action.

The OpenUsageList request invokes the OpenUsageList method, represented in FIG. 8, and this method is used to drill down to the target rows for a qusource to qutarget relationship (for example, all orders for a particular customer). The source row is obtained from the manager key, line number, page number and page rows as described above. In addition, the type of the target is passed as table name, and the relationship name is passed as target name.

The source row, the class name for the target, and the relationship name are used as parameters to the targerManager method on the source manager. This base EADP method used to data definition class as a factory class to create an application class of the correct type (based on the class name) and it assigns the relationship name and the source row so that the relationship can be hydrated to fill in the target row.

The source row is then used to set up focal data information in the request document. The request documents can specify which focal column to fill in.

The items list for the target manager is opened (this is a base EADP function which uses the qvsource to qutarget relationship from the source row to its targets within the target table to fill the items list for the target manager). The prepared target manager is then passed to fillLIst, which adds the column titles and column cell information to the request document.

updateFields

Figure 9:
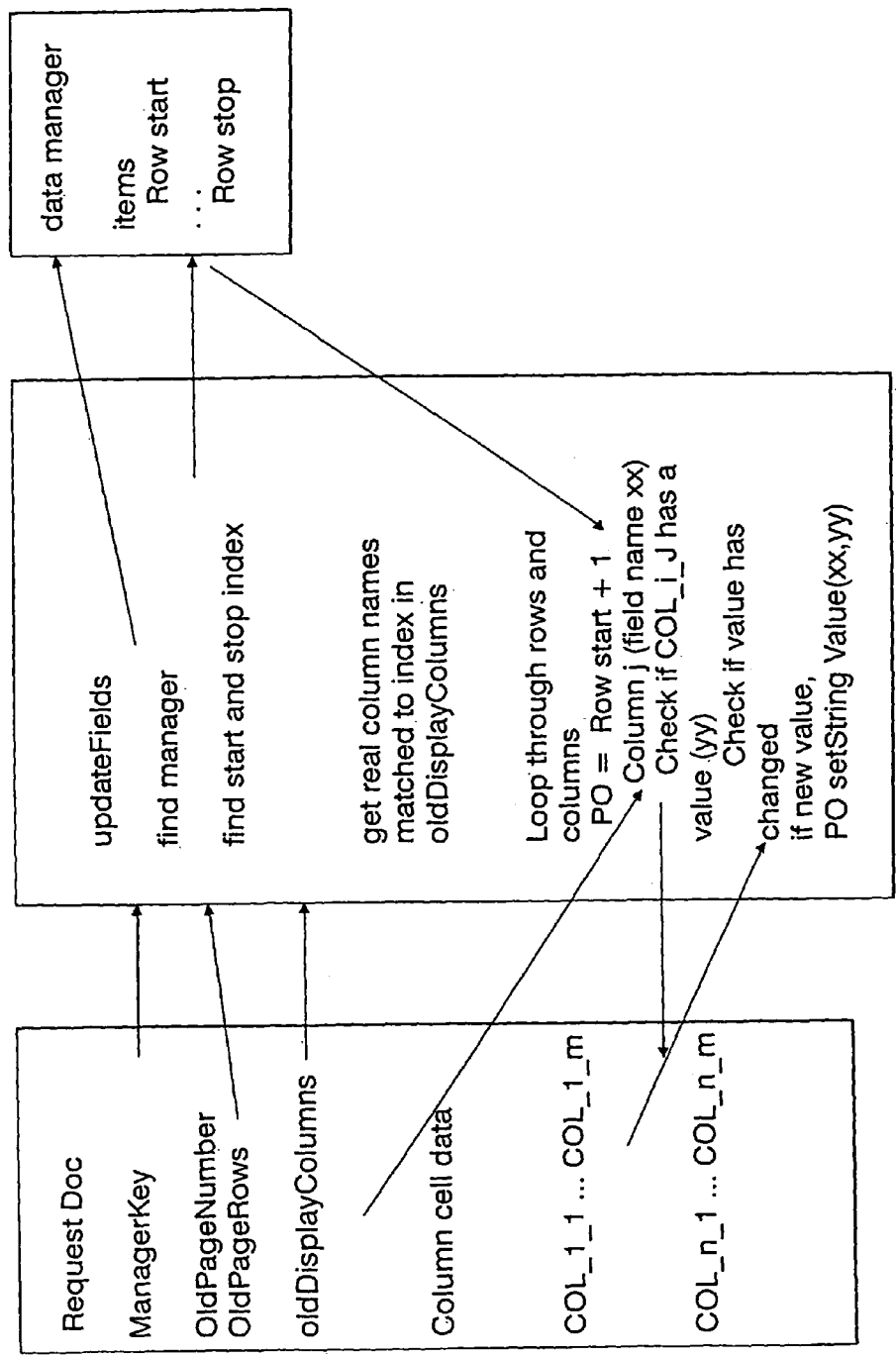
FIG. 9 represents an updateFields method.

The updateFields method, represented in FIG. 9, is used to process tubular updates from the client, and is called whenever a request is made from the client side that could include updates (for example a scroll request which is moving off of the part of a list where updates have been made, or a save request switch requires that the updates be made before the data is saved).

If a scroll is being processed, the display columns and page number in the request document will reflect the "new" window of data to be shown. However, the cell updates stored in the COL_I_j fields reflect what was on the client panel before the scroll. To allow for this, this client saves the old page number and old display columns as fields in the request document, and these are used by updateFields to locate the corresponding columns and rows on the internal objects.

The manager key in the request document is used to find the data manager within the session class. This data manager should match what was on the client side at the time it invoked the request. In particular, the items list in the data manager will be filled in, and the row positions will match the indexing passed in from the client. The old page number and old page rows information in the request document is used to find the subset of rows in the items list that matches what was shown on the client panel. The list of old display columns in the request document is used to determine the real column name for each column index. This allows the cell information in COL_I_j from the request document to be matched against the value for a particular column in a particular row. If these values are not equal, the internal row is updated to match the value from the request document. Note that this is only done for mismatches; it is important not to make extraneous updates when the client is only echoing back the same data it received when the list was opened.

The base method updateFields works with scrolls, and does nothing for 'refresh' type scrolls (where neither the page number or display columns are modified). The reason for this is that the refresh capability would be lost if the server accepted updates from the client under this circumstance. However, when a save is done, the fields have to be updated even though there is no scrolling. For this reason, there is a slight variant of the method, updateFieldsFromApply, that is called for save requests. This method does updates even if there was not a scroll.

doFocalData and updateFocalData

Figure 10:
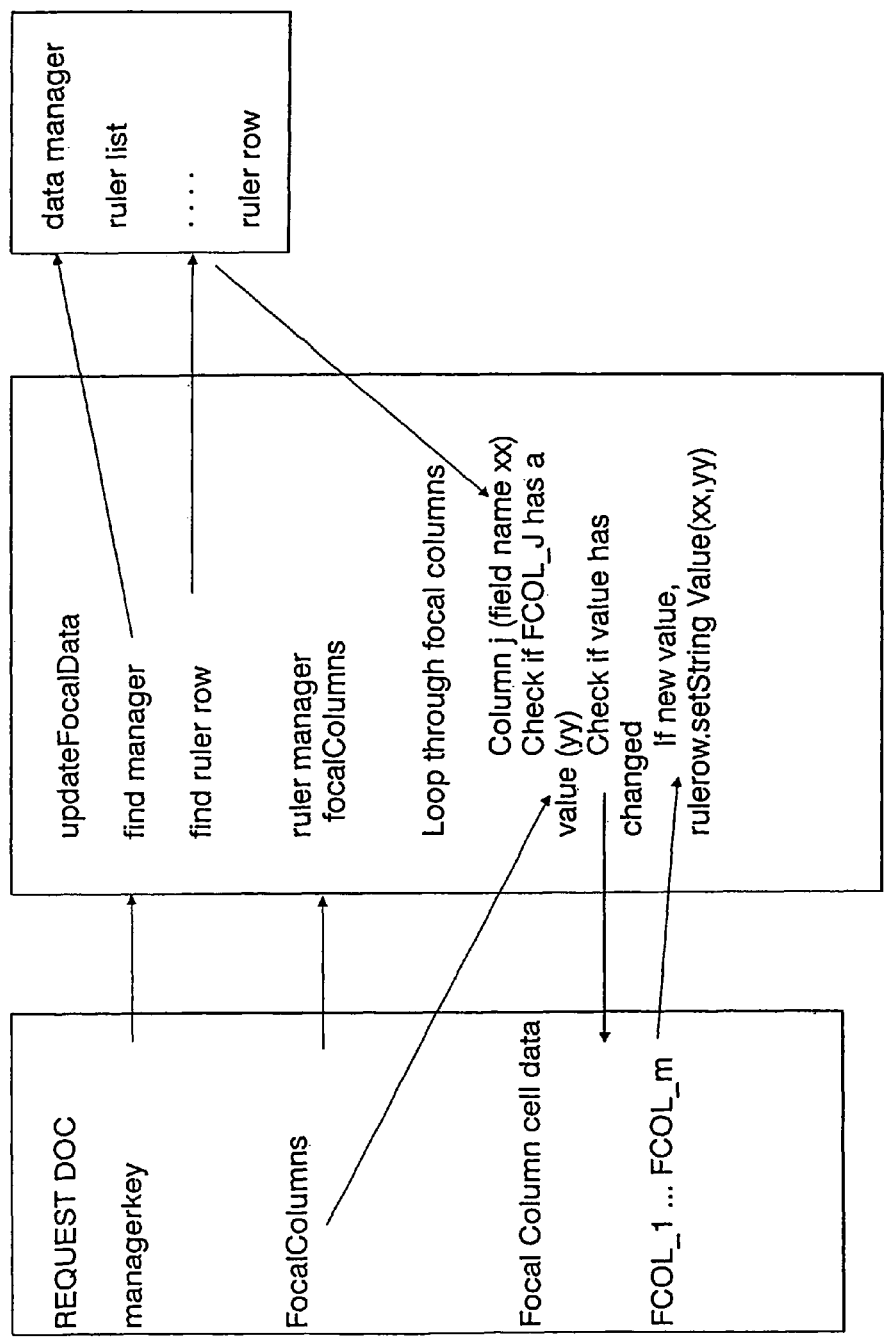
FIG. 10 illustrates an updateFocalData method.

The doFocalData method, represented in FIG. 10, is called to fill in the focal data fields from the ruler list. If the manager is a primary subobject, the ruler row can be edited along with the subobject, and in this case the request document may pass in updates in the focal data fields (FCOL_1, . . . FCOL_n). updateFocalData handles these updates. Both methods use the manager key to locate the subobject manager. The fields to be used for focal data can be specified in the request document as FocalCoumns. If this entry is absent, the last row in the ruler list (this is the row for the immediateruter of thesubobject) is accessed. Its data manager is the ruler manager for the subobject, and the focalData property of that manager is used to fill in the focalColumns (that property. allows focalColumns to be specified to be different from the display columns, but it defaults to display columns if no customization is done for the focal columns).

Once the focal columns have been determined, this allows a match of the index in the FCOL_i cell data to the real column name. As with update fields, this value is matched against the value in the ruler row for that column, and the ruler row is updated if there is a mismatch, The updateFocalData method then uses the focal data row in the manager (this is created to combine all the values from all the ruler rows) to fill in the focal data based on the focal data column names.

scrollList

The various components of the ScrollList method have already been described. The manager key, pages rows, old page number, new page number, old display columns and new display columns are all passed in the request document. The first step is to call doFocalData (which may call updateFocalData) to handle the focal data. The updateFields is called to pick up any updates that may have been made on the part of the list that is being scrolled past. Finally, fillList is called to display the new data from the scroll.

If the scroll is beyond the end of the items currently in the list for the data manager, its reopen method is called to fill in more rows. This allows controlled database scrolling of unbounded sql queries.

addRow, copyRow and deleteRow

These methods all use the manager key to find the current manager, and the line number, page number and page rows to find the current position in the items list for the current manager. They then call the corresponding method on the data manager. For deleteRow, the current position gives the row to be deleted. For copyRow the current position is the copy from row. For addRow, the current position shows where in the items list the new row is to be placed (this is so if the list has been scrolled the and new row shows up on the currently displayed page).

After calling the method on the data manager, scrollList is called to redisplay the items list reflecting the change.

openSelectList

One of the major features of EADP is its ability to handle quick view relationships (for example, customer data for an order). One aspect of this is the ability to selection an entry from the "source" table (e.g. customers) to update the target relationship (the customer for an order). The selectManager method on the EADPDAManager is used to create a selection manager of the appropriate type based on the selected row and the quick view relationship name (this determines the source table type).

Figure 11:
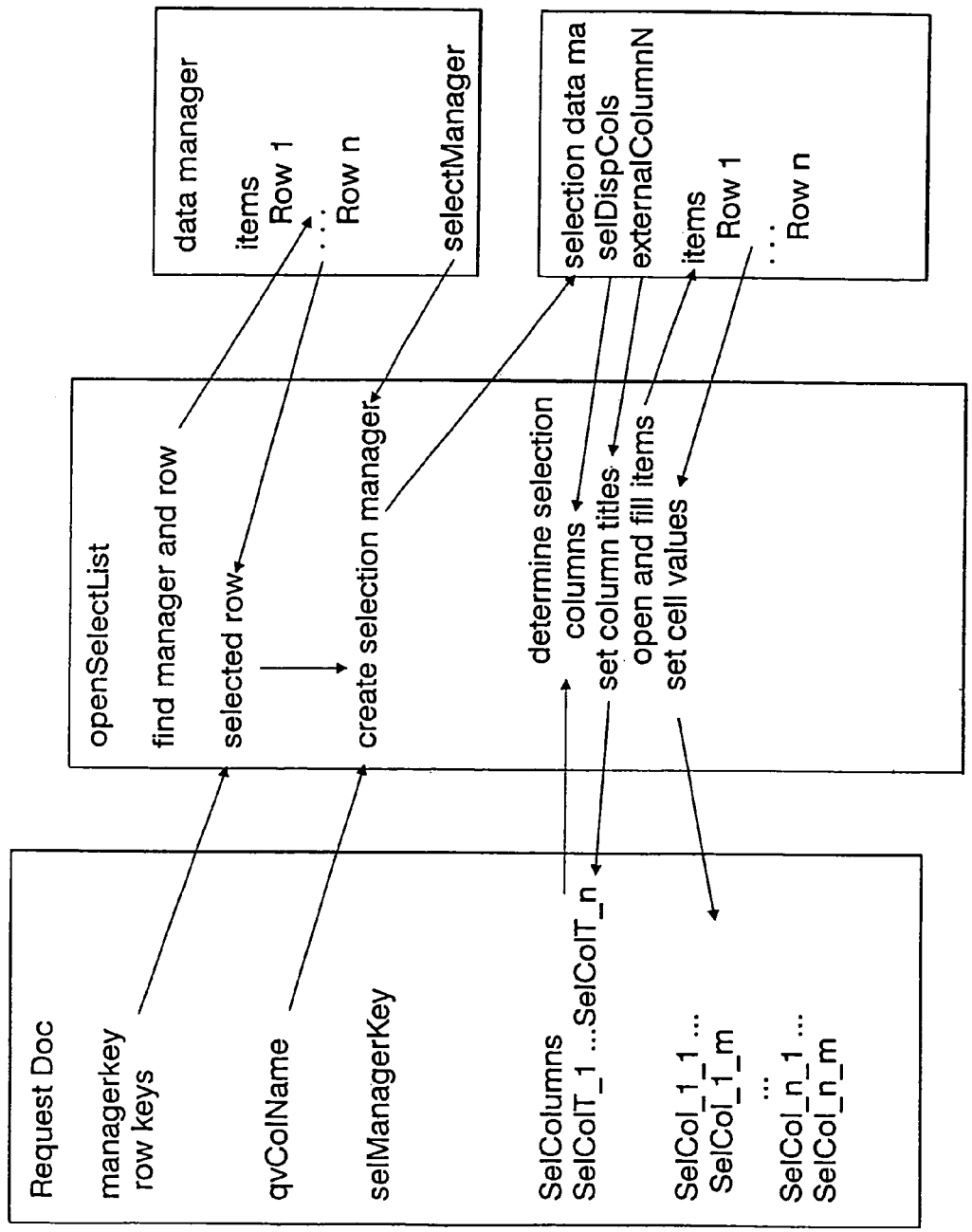
FIG. 11 represents an OpenSelectlist method.

With reference to FIG. 11, the openSelectList method on the session class finds the current manager, the selected row, and the quick view relationship name from entries in the request document. It then creates the selection data manager using the selectManager method, and opens a list of items. If the request document has selection columns specified, these are used to set up the columns used for display, otherwise the selDispCols field in the manager for the selection list is used. This allows customization of the selection columns to be different from the ordinary display columns. It is also possible for the request document to pass in selection criteria and sort columns (this would require a customization on the client side to refine these parameters for a particular type of selection). The column titles are placed in SelColT_i where i is the index of the selection column, using the external column name for that column.

The selection columns and the rows from the item list are used to add the data for each cell to the request document. The value for row i and column j is placed in SelCol_I_j using getStringValue on row i passing the selection column name for index j.

The reason the SEL is appended at the front of the name is for the Lotus Notes client. The selection list comes up in a dialog box, and it is important not to confuse its field names with the field names for the underlying list panel (which uses COL_I_j for its list cell elements).

quickOpen

Figure 12:
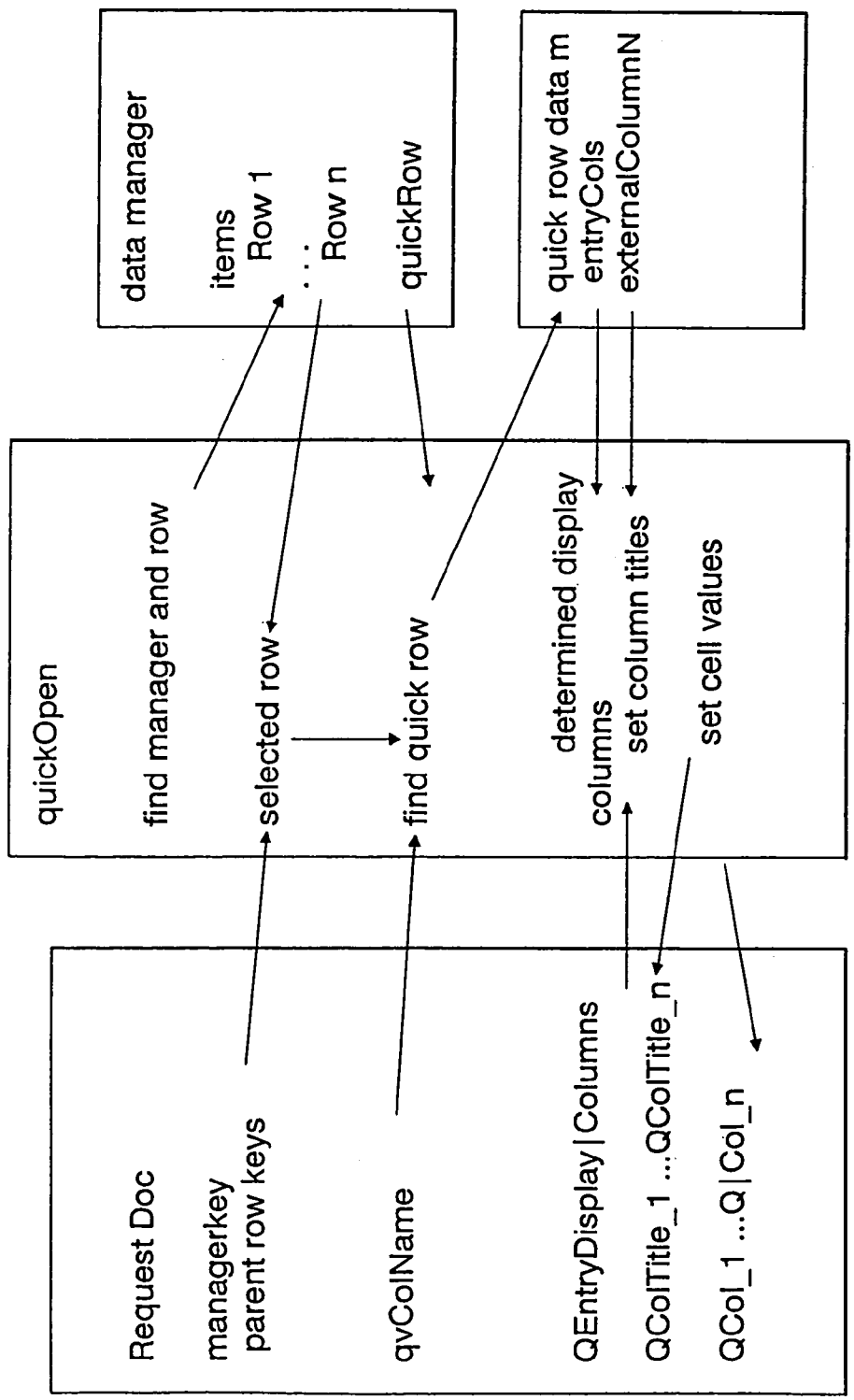
FIG. 12 represents a quickOpen method that may be used in the adapter layer.

The quick open function, represented in FIG. 12, is used to provide full data for the source of a quick view relationship (for example, customer data for the customer for an order). The EADPDAManager provides the quickrow method which takes the target row (the row of order data) and the relationship name, and uses these to find the source row for that relationship (this is returned as the quick row). The quickOpen method on the session class makes use of this function. It uses passed key information in the request document to find the selected row (the target row) and then uses the relationship name to invoke quickRow. The datamanager for the quick row is used to default the display columns and to set the external column names.

As with the quick view selection, the quick open fields in the request document are given unique names because the Lotus Notes client opens this in a dialog box.

doQuickSelect

Figure 13:
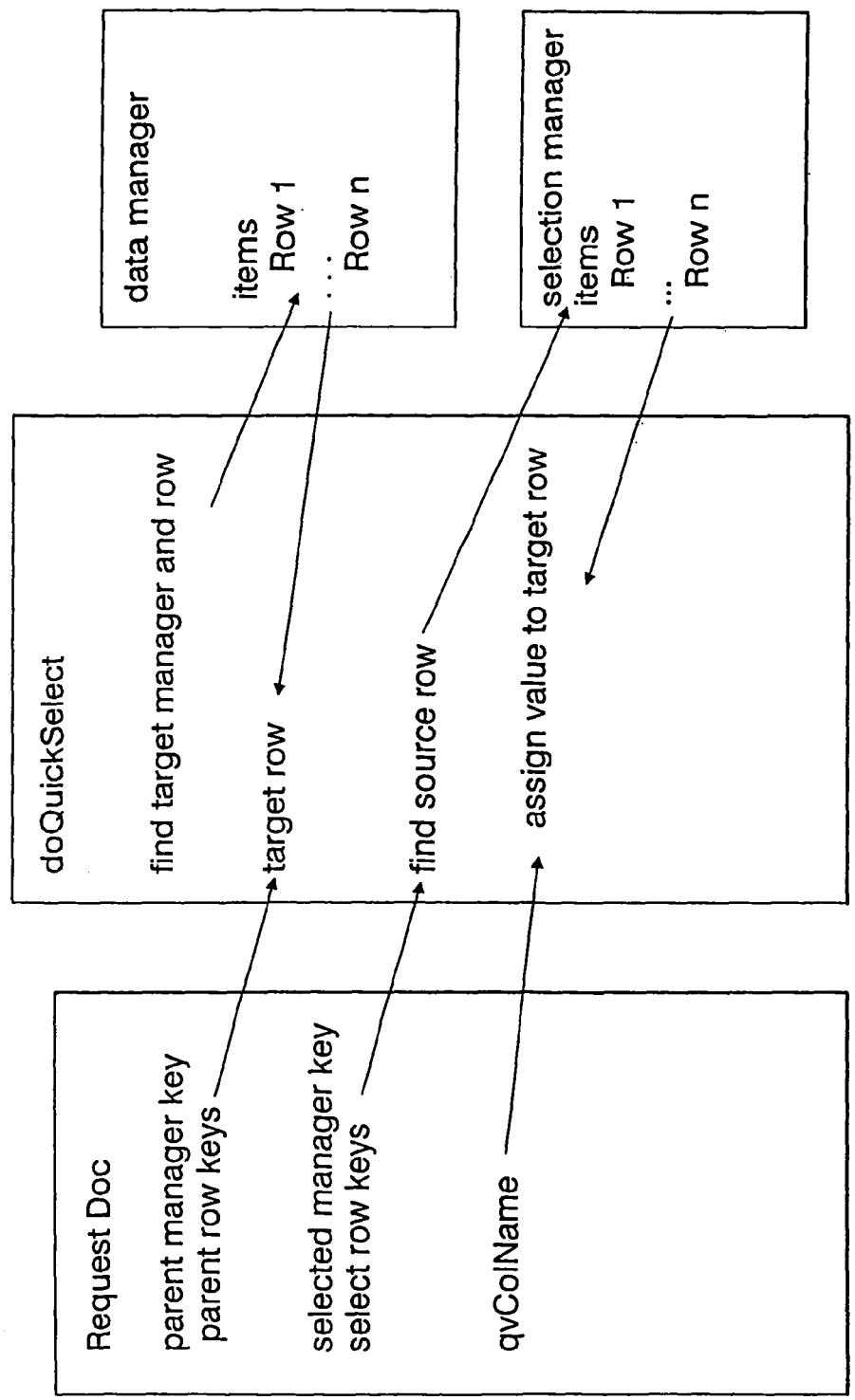

With reference to FIG. 13, the doQuickSelect method is used to assign a new value for the source of a quick view relationship (for example, the customer for an order). The action is invoked from the client side from the quick view selection panel. The request document passes back the selection information for the "target" row (for example the row of order data) as parentManagerKey, parentLineNumber, parentPageNumber, and parentPageRows. The selection information for the "source: row (for example the selected customer) is passed as SelectManagerKey, SelectLineNumber, etc. The two managers are found using the manager keys, and the rows are found in the items list for each manager. Then the relationship name (passed as qvColName in the request document) is used with the "bean" part of the source row to set a new source for the relationship (using the setValue method on the target row).

Figure 14:
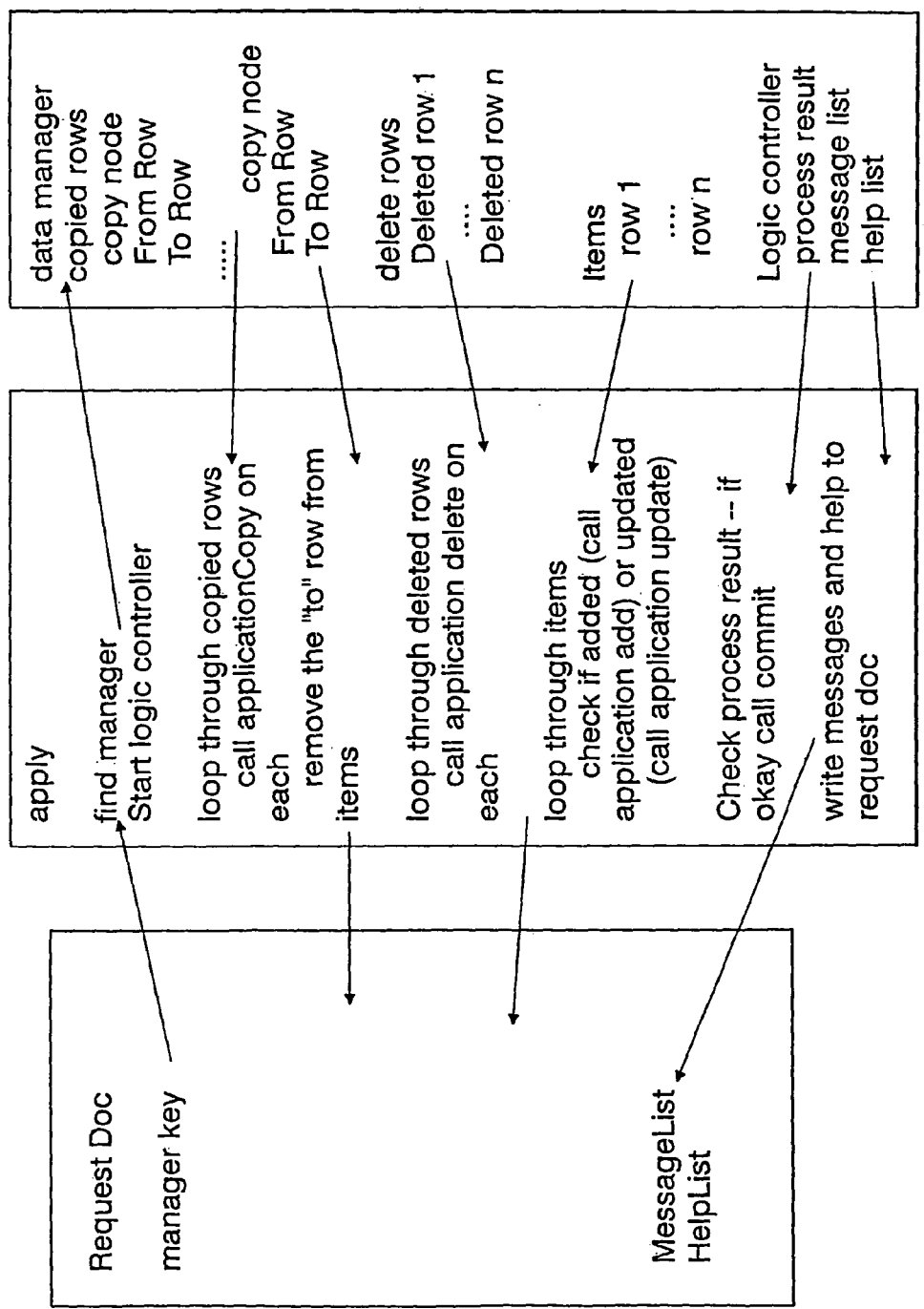
FIG. 14 illustrates an apply method.

The apply method, illustrated in FIG. 14, is called to save updates made to a list. It finds the manager by manager key, and starts up the logic controller for the manager. This keeps track of the "processResult" which records the worst result of any verifications performed during the apply process. Many of the function invoked by this method is base EADP function described in other copending parent applications (applicationCopy for each copied row, applicationDelete for each deleted row, applicationAdd or applicationUpdate for added or modified rows). These functions provide rich EADP functionality such as cascading the copies and deletes to subobjects (see U.S. patent application Ser. No. 09/615,976 END920000083US1) and verifications for each type of update process (see U.S. patent application Ser. No. 09/616, 800 END920000079US1).

After the processing of the individual rows, the process result from the logic controller is checked for errors before the commit. Any messages or help texts added by the logic controller for failed verifications are written to the MessageList and HelpList items in the request document.

openRow

Figure 15:
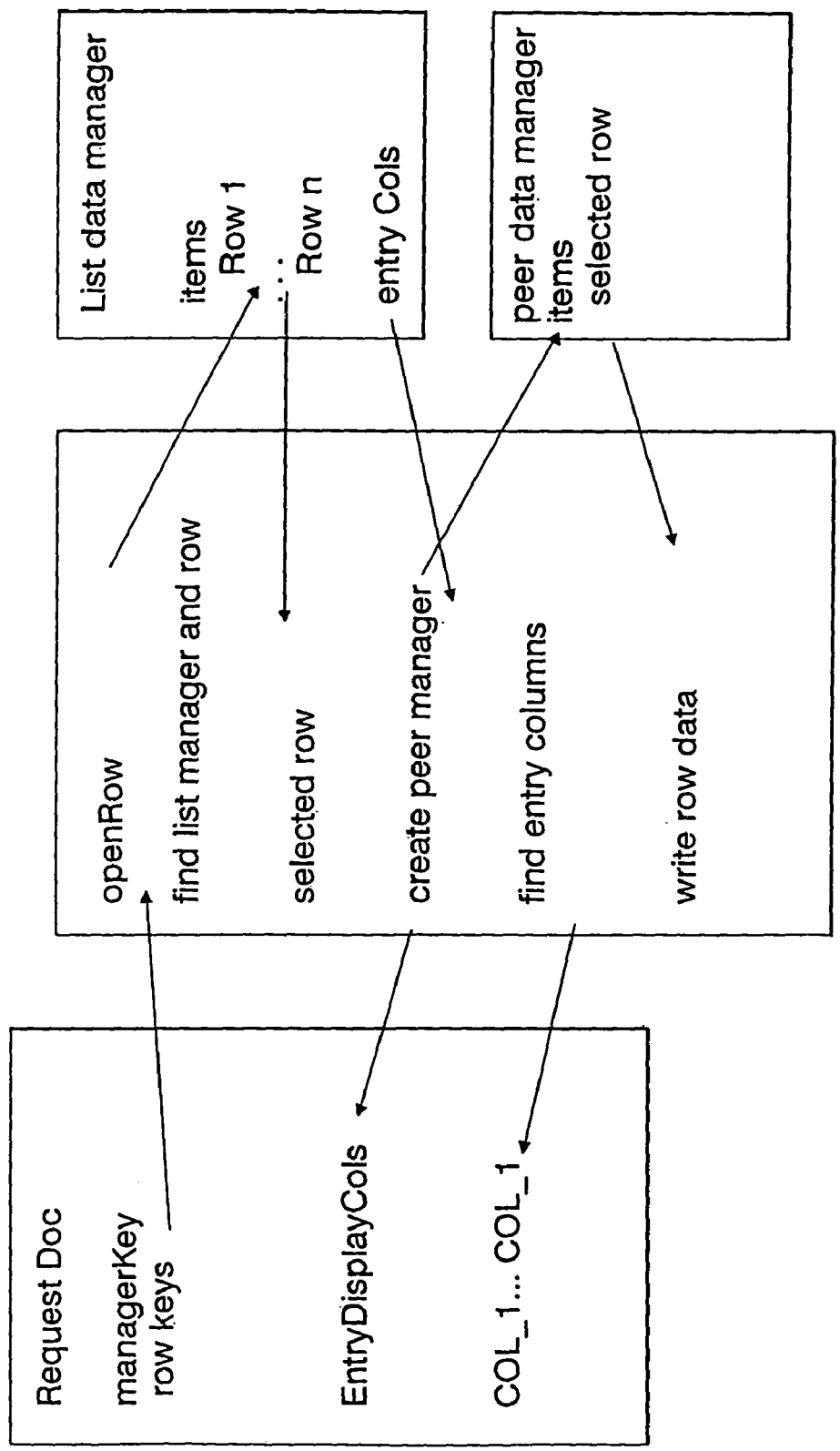
FIG. 15 represents an openRow method.

With reference to FIG. 15, the openRow method is used to display data for a selected row in a list. The request document will contain the manager key (the item list for the manager will include the selected row) and line number, page number and page rows to identify the selected row. The openRow method locates the manager and the row. It then creates a peer manager, which is a data manager of the same type that gets the ruler list of the list manager, but only the selected row in its items list.

The method determines whether or not the row can be accessed in its own unit of work. If it has not been updated on the list panel, it is opened in its own unit of work. If it has been updated on the list panel, those updates are copied over to the peer manager, and it is kept in the same unit of work as the list panel. The "Independent" item is written to the request document (as yes or no) to indicate this.

If the client has placed EntryDisplayCols in the request document, this is used to determine which columns to be used for display. Otherwise, the entryCols property of the data manager is used. This can be customized to specify a different set of columns to use for entry as opposed to list panel (typically the entry panel will show more columns than the list panel). The index of the real column name is used to determine which value goes into COL__1, ... COL_n in the request document. As with the list panels, the list is placed there each item value, with the first entry being the string value of the column (the result of getStringValue for the column name on the selected row), the second being the real column name, and the third the list of permitted value values for "bft" type fields.

updateRow

After the processing of the individual rows, the process result from the logic controller is checked for errors before the commit. Any messages or help texts added by the logic controller for failed verifications are written to the MessageList and HelpList items in the request document.

openRow

Figure 16:
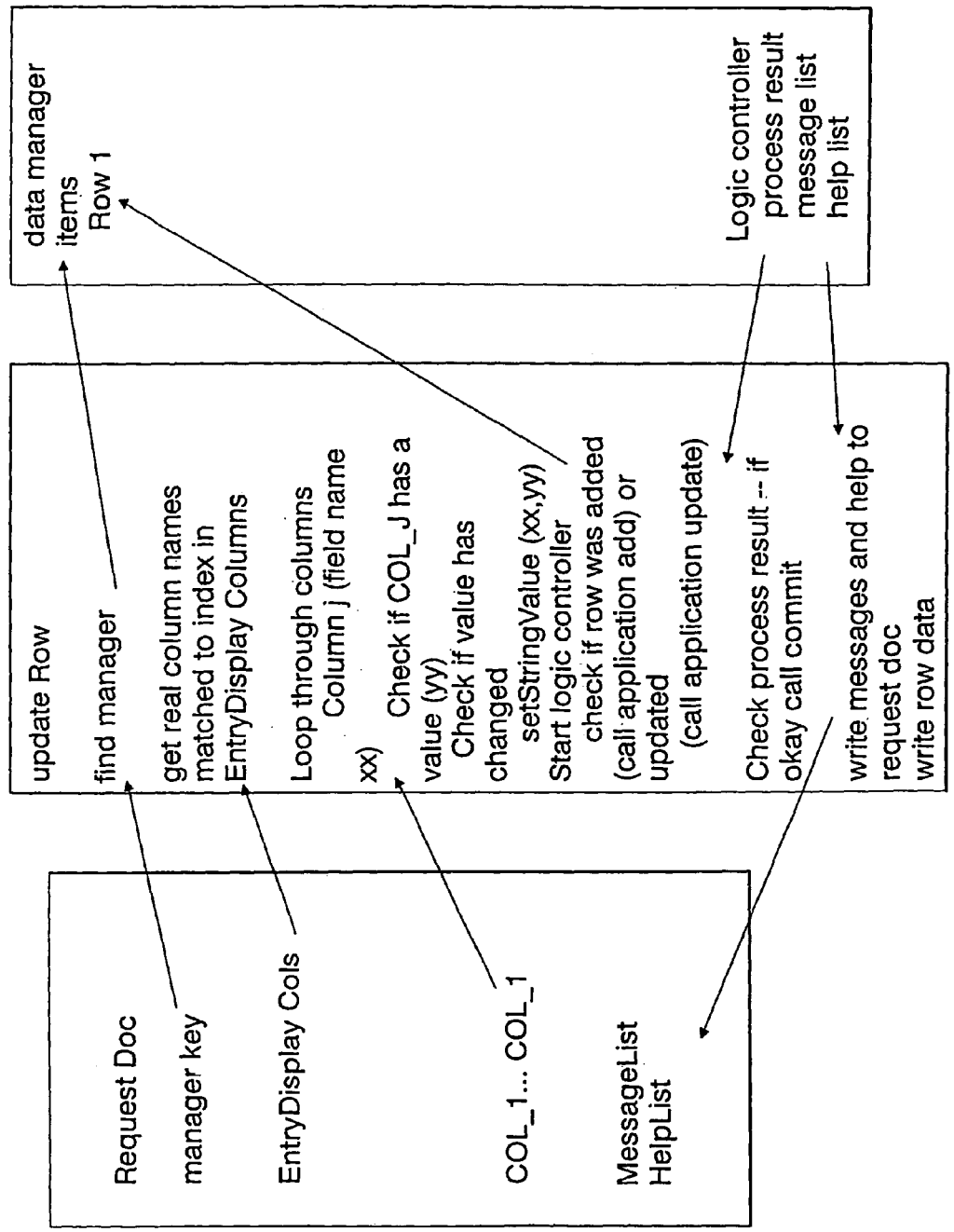
FIG. 16 represents an updateRow method.

The updateRow method, represented in FIG. 16, is called to save data from an entry panel on the client side. The EntryDisplayCols field in the request document is used to determine the index of each real column name in the COL_j fields in the request document. These are used to update the selected row (there should only be one row in the items list, which is the row to be updated). The rest of the processing is similar to the apply method, except that there is only one row in the items list, and there are no copied or deleted rows to process.

Client Side Processing

While the server side processing is very similar for the Lotus Notes and Web implementations, the client side implementations must adapt themselves to the enveloping technologies. The client side has the responsibility for presenting data, receiving updates, maintaining some state data such as the window list and the manager key for each page. In the case of the Web implementation, some of this function resides on the Web server.

Panel Definition, Creation and Presentation

Here "panel" refers to a window presented on the client, side. For the Lotus Notes client this is presented as a window within that application. For the Web application, the panel is presented in the Web browser using HTML and JavaScript generated by the server.

Lotus Notes Client Panels

The Lotus Notes implementation uses a client side database to present the application. The various types of panels described below are implemented as Lotus Notes forms (there are default forms for each type of panel, with the capability of overrides).

Figure 17:
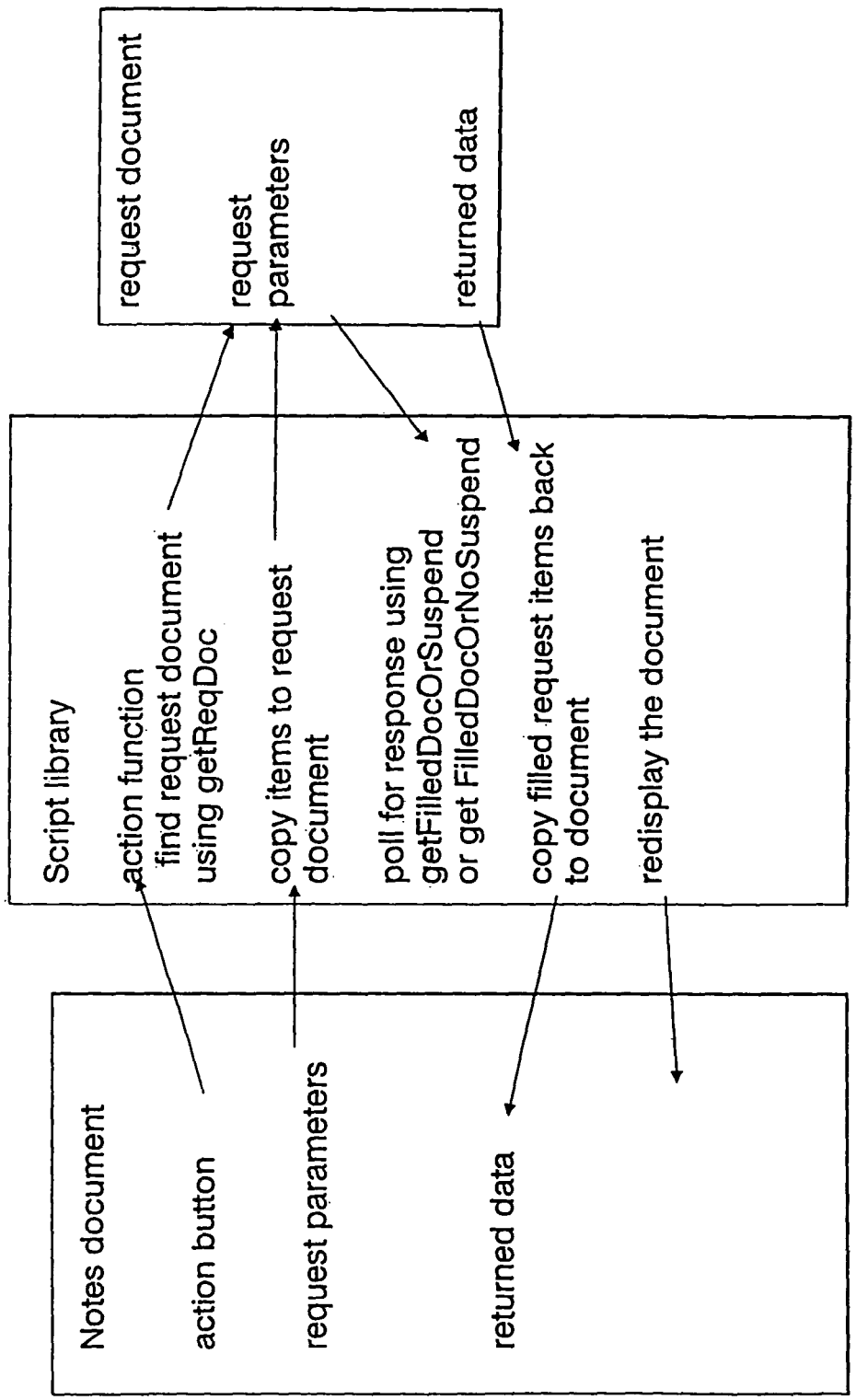
FIG. 17 represents a Scripts Library.

With reference to FIG. 17, the notes form includes action buttons for various activities such as open list, scroll, save, etc. These map to functions in the script library (this approach allows the form to be modified without affecting the underlying code needed to interact with the server). The action function will call the common function getReqOoc to find the request document, then copy request parameters from the displayed document to the request document. It then sets the request type to pending to indicate to the server that the request needs to be filled. Then it polls for a response using either getFilledDocOrSuspend or getFilledDocNoSuspend. The difference in these two functions is that the first will free up the client session if the request document is not available. The second version freezes the client session until the request document comes back from the server. Once the request document has been retrieved, its returned data is copied back into the displayed document, and it is refreshed so that the new data is visible to the user.

Web Client

Figure 18:
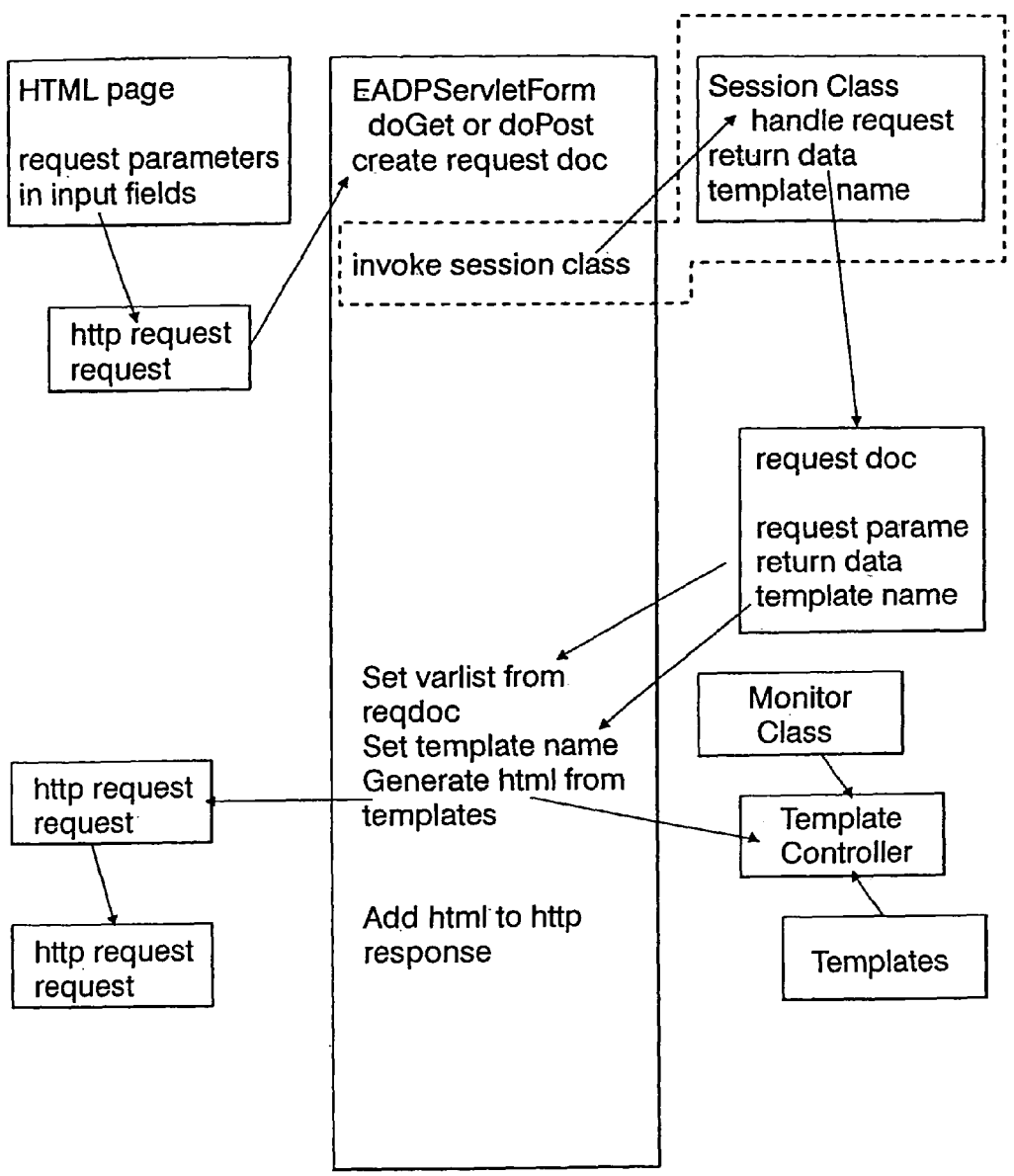
FIG. 18 illustrates the split between client and server side processing for a web client.

For the web client, the split between "client" and "server" side processing is different. In FIG. 18, the circled portion (the invocation of the session class to handle the request) represents "server" processing in the adapter layer architecture. The rest of the processing within the servlet (creating the request document, and using the data from the request document to generate html to return to the Web browser) are "client" side functions in the context of the adapter layer.

The Web client initiates a request by submitting an HTML page (this page would have been generated by a previous cycle of this process). This page contains fields that correspond to ones used in the request document (e.g. the requested action, column cell values, page number, line number, session key, manager key, and other fields needed for that particular request). The HTML page may also have some processing it does (using JavaScript) to prepare these fields before issuing the submit. The fields are passed to the servlet (the EADPServletForm) in the http request.

The EADPServletForm takes parameters from the http request and formats them into the request document (this is an EADP request document which supports the same access methods as a Lotus Notes document). To this point all the processing corresponds to "client" side initialization of a request. The servlet then performs "server" side processing to handle the request.

After this, the servlet performs more "client" side processing to return the results of the request. This involves generating a fresh set of HTML that reflects the data placed in the request document by the session class. The technique to do this uses the EADP text file processing facility (see U.S. patent application Ser. No. 09/616,808, now U.S. Pat. No. 6,857,103, issued Feb. 15, 2005). The content of the request document is stored as a hash table (the item name is the key) which is passed as the variable list to the template processor. The templates used to generate the HTML are controlled by the monitor class. The base templates are stored in EADPServletMonitor, but each application will define its own monitor class as a child of EADPServletMonitor, and also add and revise templates.

When a template is accessed, the search pattern is to look for the template first in the set of templates defined in the application monitor class, and then in the templates defined in EADPServletMonitor. This means that the html for an application can be modified from its base definition by placing a template with the same name in the application monitor class.

The associated macros to process html templates are in a special package com.ibm.eadp.servlet.macros (the base macros for template processing are in com.ibm.eadp.macros). An application can add its own macros by placing them in the same package as the application monitor class (it can override the base macro by adding a macro with the same name). When macro names in the templates are resolved into classes, the search pattern is to look first in the application package, then in com.ibm.eadp.servlet.macros, and finally in com.ibm.eadp.macros.

Types of panels that are used on the client side:

List Panels

List panels are used for display and tabular update. They contain a column title row (each cell is populated from the ColTitle_j entry in the request document) and multiple rows of data (the cell data for row i and column i is populated from the COL_I_j data in the request document). Each row also has a button that allows row selection. List panels can be shown in browse or edit mode. In browse mode, scroll buttons for scrolling up, down, left or right are shown if there is data to scroll to in that direction. If the currently listed object has relationships that allow further navigation (it is the ruler of a subobject or the source of a quick view relationship) there is a drill down button displayed, along with a list of the relationships. A choice of row and the relationship then allows drill down, either to a subobject or usage list.

There is also a button presented for edit mode, if the user is allowed to edit the data.

In edit mode, additional buttons are added to delete rows, add rows, and copy rows. In addition, prompts are available for each cell with a field with discrete values to show the permitted values, and for "quick view" fields to allow quick open or selection of a new source row for the relationship.

From this description, and the description of the server side resources available, it should be fairly clear how the client side maps to the request document to perform these various activities. The selection button for each row is used to set line number in the request document. For scrolling, the scroll button is used to offset the display columns (for scrolls right and left) and the page number (for scrolls up and down).

For the Lotus Notes client implementation, the list panel is a form with fields (named ColTitle_1 through ColTitle_8 and Col_1_1 through CoL10_8 used for the display of the data. There is also a "row marker" field for each row used to indicate if that row has data. Hide-when formulas are used to adjust the display so that only fields with data from the request document are shown. The various actions are implemented as Notes buttons (the scroll buttons are in the action bar) which call associated functions in the script library.

For the servlet implementation, the list is presented as an html table generated using templates and macros.

Figure 19:
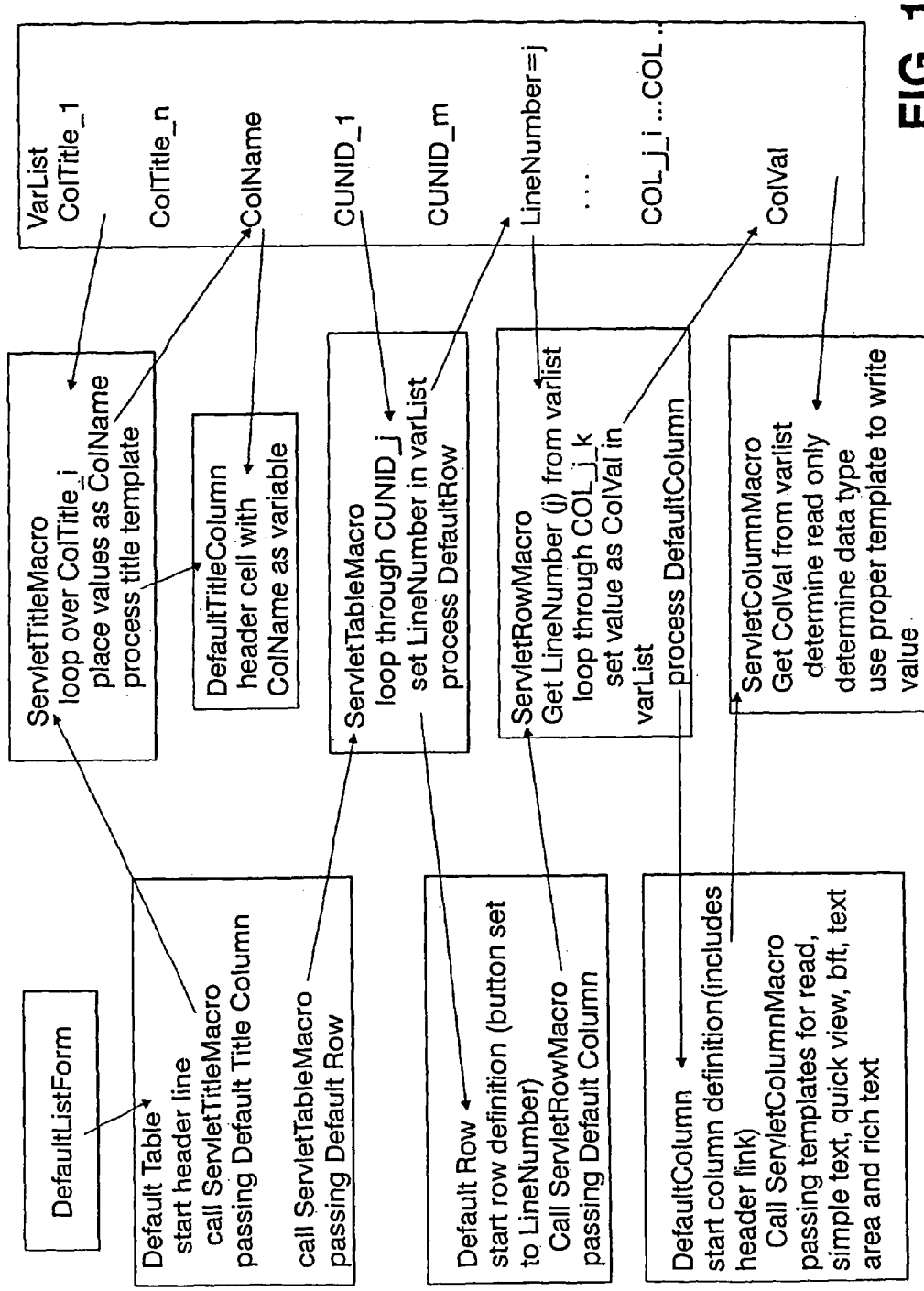
FIG. 19 shows a sequence of templates and macros that may be used to build up an html table.

With reference to FIG. 19, the html to present the table is built up using a sequence of templates and macros (shown in FIG. 19 in simplified form). The list form includes the DefaultTable template, which as the name suggests starts and ends an html table and then has sections to created the table header and body. The header is create by calling the macro ServletTitleMacro, passing the template to render each header cell (the DefaultTitleColumn). The macro loops through the column title entries in the request document (ColTitle_1 ... ColTitlej). For each entry, the value is placed back in the request document and ColName, and the DefaultTitleColumn (which has $ColName$ as its variable name) is called to write out the html for that title cell.

The body is generated by calling ServletTableMacro, passing DefaultRow as the next template to process. This macro determines the line numbers to process by looping through the CUNID_1 to CUNID_k entries in the variable list (these are placed in the request document to indicate the presence of a row with that index), and stripping off the final numeric string, and placing it in the variable list as the LineNumber. It then processes the DefaultRow template (or one that was passed in to it from another source) for each line number.

The DefaultRow template has logic to set up a line number button at the start of the row using the LineNumber value in the variable list. It then calls ServletRowMacro (which will loop through the cell values for that row) passing the DefaultColumn template. The ServletRowMacro (for line number j) loops through the COL_j_1 through COLJm values in the variable list (these are the cell values in the request document).

Scrolling

The client side is responsible for maintaining the current state for scrolling. There are several fields maintained on the client side to achieve this.

The following fields are used to control left/right scrolling:

TotalDisplayCols—this is a list of all the display columns that can be shown for the list.

CurrentDisplayCols—this is the list of display columns currently being displayed or the next set to display if a scroll command is processed.

StickyCols—the number columns leftmost columns that are shown at all times.

PageCols—The number of columns to be shown per page.

ColumnOffset—a counter used to indicate how many scrolls to the right have been made.

OldDisplayColumns—this is used to save the current display columns when a scroll command is processed.

Two buttons are used to control left right scrolling (a scroll left and a scroll right button). The scroll left button is displayed only if the column offset field is greater than zero. The scroll right button is displayed if there are columns in the total display columns list further down the list than the current display columns. Since the sticky columns stay on the current screen at all times, the number of columns displaced for each scroll request is the number of columns displayed on each page minus the number of sticky columns. A scroll request to either the left or right is processed on the client side by saving the currently displayed columns in the old display columns, adjust the column offset, and then recalculating the current display columns. All these fields are then placed in the request document with a request action of ScrollList and passed to the server for processing.

For the Lotus Notes client the CurrentDisplayCols field is a computed field as described above. The scroll button for left or right scroll calls a Lotus Script function that increments or decrements the column offset, then calls computeWithForm on the list document to reset the display columns. These are then processed as described for all these actions to create the request document and invoke the server. The scroll buttons have hide-when formulas to make sure that they are only displayed when that type of scroll is possible.

For the Web implementation, JavaScript functions on the HTML page are used to process the left/right scrolls. The various column lists described above are stored as hidden fields in the HTML page (these are input fields of type hidden, and the lists are stored as text stings with a separator (% T %) used to break up the list entries. EADP provides JavaScript utility functions toList and subSegs which are used for client side list processing. The toList function will turn a string with list separators into an array of strings (broken at the separator). This is used to turn the column lists stored as strings into arrays of strings for processing. The subSegs function is used to pick out a subset of a list stored with separators based on a start and end offset. It uses toList to turn the source list into an array, then takes the portion of the array indicated by the start and end offsets, and writes it back into a string using the separators.

When the html for the list panel is generated, these list scripts are included (there is an imbed statement for the ListScrpts template which includes these two scripts).

The scroll buttons on the list panel are imbedded with a statement that calls the ScrollButtonMacro, passing the scroll action (ScrollUp, ScrollDown, ScrollRight, ScrollLeft) and the ScrollButton template, which has the html for the scroll buttons. The ScrollButtonMacro checks the type of scroll, and uses other information in the request document (for left/right scrolls the column offset, sticky columns, columns per page and the number of total display columns) to determine if that type of scroll button should be included in the generated html. If so, the ScrollButton template is used to create the scroll button for that scroll action.

For both the clients and the servers, the scroll buttons call a common function that takes the vertical and horizontal scroll amounts (implemented in Lotus Script or JavaScript).

Vertical scrolling follows much the same pattern as the horizontal scrolling, except that the relevant control fields are page number, row per page, and total rows. The last is placed in the request document by a sql call at the end of fillList (on the server side) which gets a count of the results of the sql query. This is done separately from the sql call to fill in the results of the query for each page, since that is limited to fetch only the number of rows indicated by the maxRows field.

On the client side, the scroll up and scroll down buttons just increment and decrement the page number (the old page number is saved so that any updates placed on the panel before scrolling can be processed). The scroll up button is hidden if page number is one, and the scroll down button is hidden if the page number multiplied by the rows per page is greater than the total rows. The bulk of the vertical scroll processing is handled on the server side.

Quick View Processing

If a cell holds a value that is derived from a quick view relationship, the client side allows two actions: quick open, which opens an entry panel with complete data for the source of the quick view relationship (e.g. customer data for the customer for an order) and selection of new source data from a listing of the source table (e.g. bringing up a list of customers and allowing selection of a customer from that list).

For the Lotus Notes client, these are handled using dialog boxes. Each field in the list part of the list form (the COL_i_J fields) has its "entering" field event defined to call the enteringFields script. This script uses the column index in the field name to determine the real column name from the display column field. If the column is a quick view column (these column names all start with qvsource) a dialog box comes up that offers a selection of quick open or quick select (the latter option only comes up in edit mode). Selecting one of these options then brings up another dialog box for the quick view entry or quick view selection. These are filled in using the functions described in the server section.

For the web client, the ServletColumnMacro makes a determination of the column type at the time the html is generated for the page. For quick view columns it uses the DefaultQuickViewColumn template, which generates a link to the JavaScript ClickQv function, passing the column and row identification. This function opens a new window which has buttons to open a quick view or do a quick selection; these buttons submit that window to the server to invoke the corresponding server actions to fill in the data.

Entry Panels

Entry panels follow much the same pattern as list panels, except that they are linked to the entry panel methods (openRow, updateRow) on the server side.

Client Windows

Figure 20:
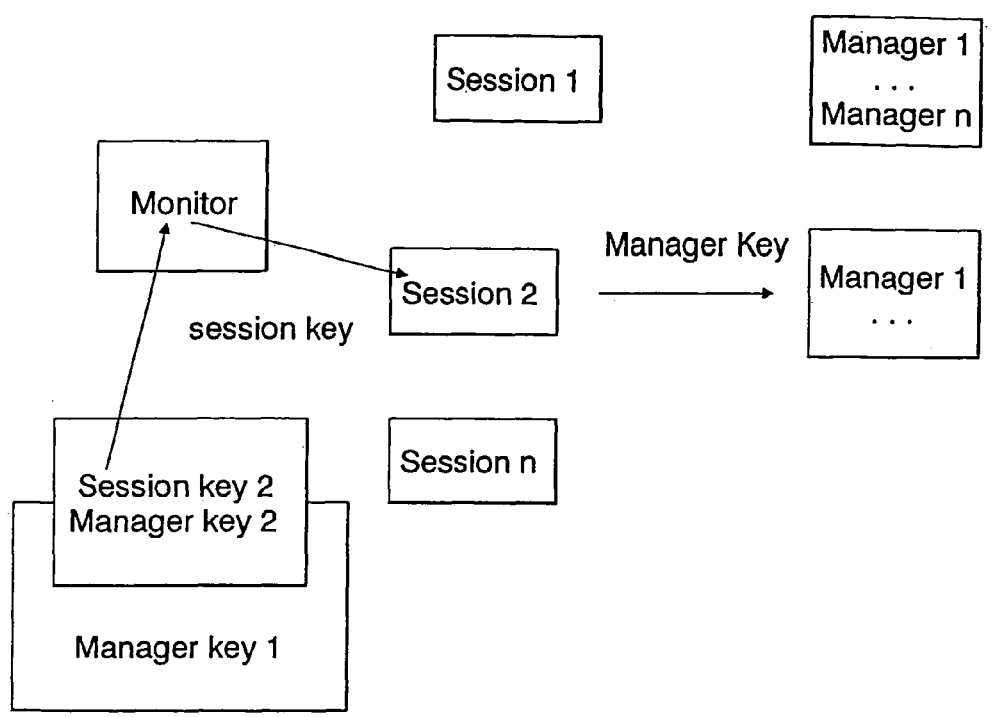
FIG. 20 illustrates multiple managers within the same session class.

It was discussed earlier in connection with FIG. 3, how the server side keeps track of multiple sessions, and for each session multiple data managers. With reference to FIG. 20, each of these data managers represents a different thread of processing, and can be independently processed. On the client side, multiple "windows" can operate at the same time, where each window corresponds to a different manager within the same session class on the server side. Each window stores in the client side both its session key and manager key. For the Lotus Notes implementation, each window is represented by a different Lotus Notes document, and the session key and manager key are stored as Notes items in that document. The window list provided by the Lotus Notes client is used to show the different active windows for that session. For the Web implementation the session key and manager key are written to hidden input fields when the html is generated, and are passed back to the server when the html form is submitted.

Figure 21:
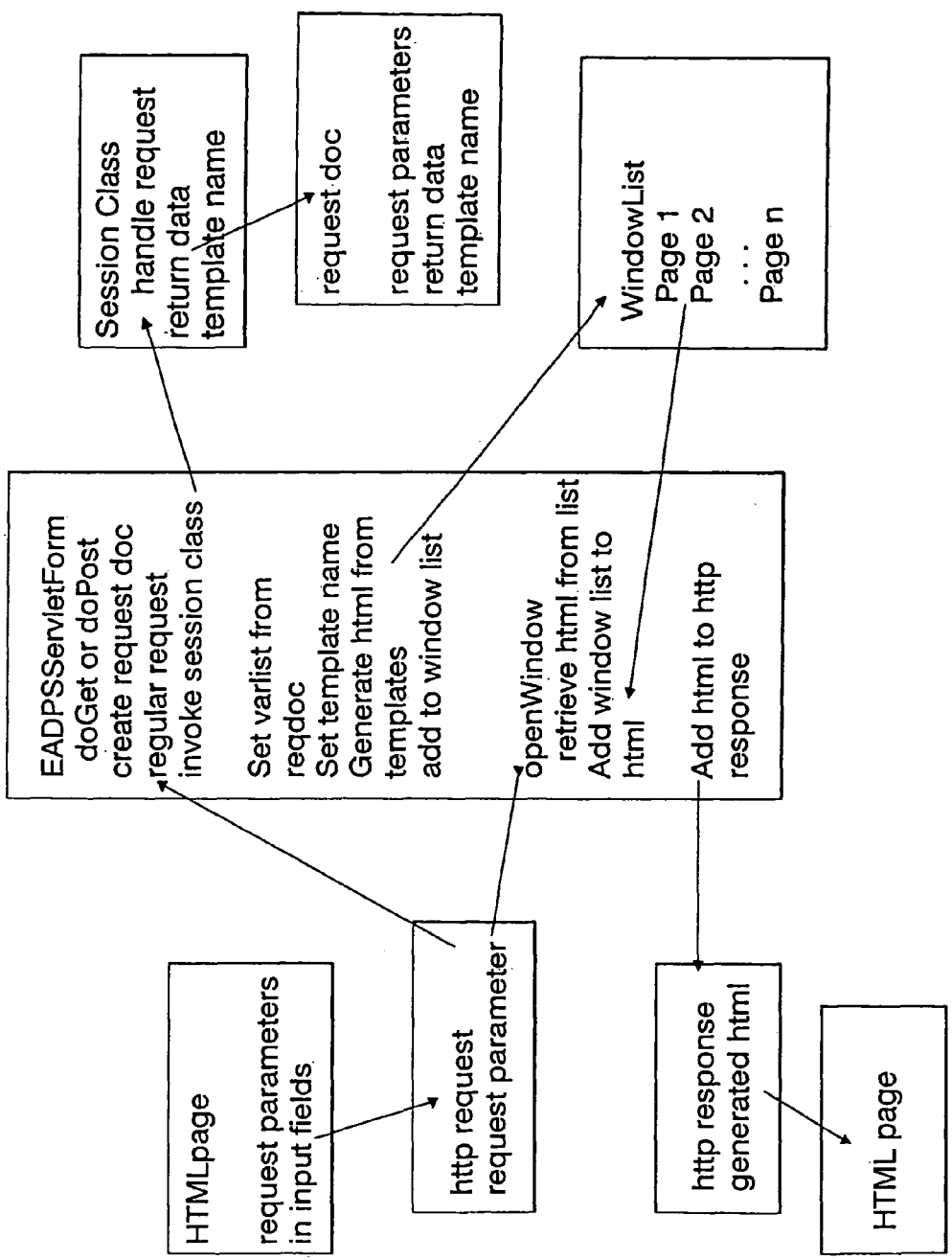
FIG. 21 illustrates a window list.

With reference to FIG. 21, each session class keeps a "window list" which is a vector that contains html for its active pages. Each page that is generated to send back to the client is also stored in the window list. A second pass through the template generator adds html for the active windows to the page before it is finally sent back to the client. When the client issues an open window request (as a result of clicking one of the links in its window list), the servlet bypasses calling the session class to process the request, and instead retrieves the html for that session from the window list. The html for the current list of windows is added (so that even if the page was stored a while ago it will always show the current window list) and the page is returned to the client.

Unit of Work Control

Figure 22:
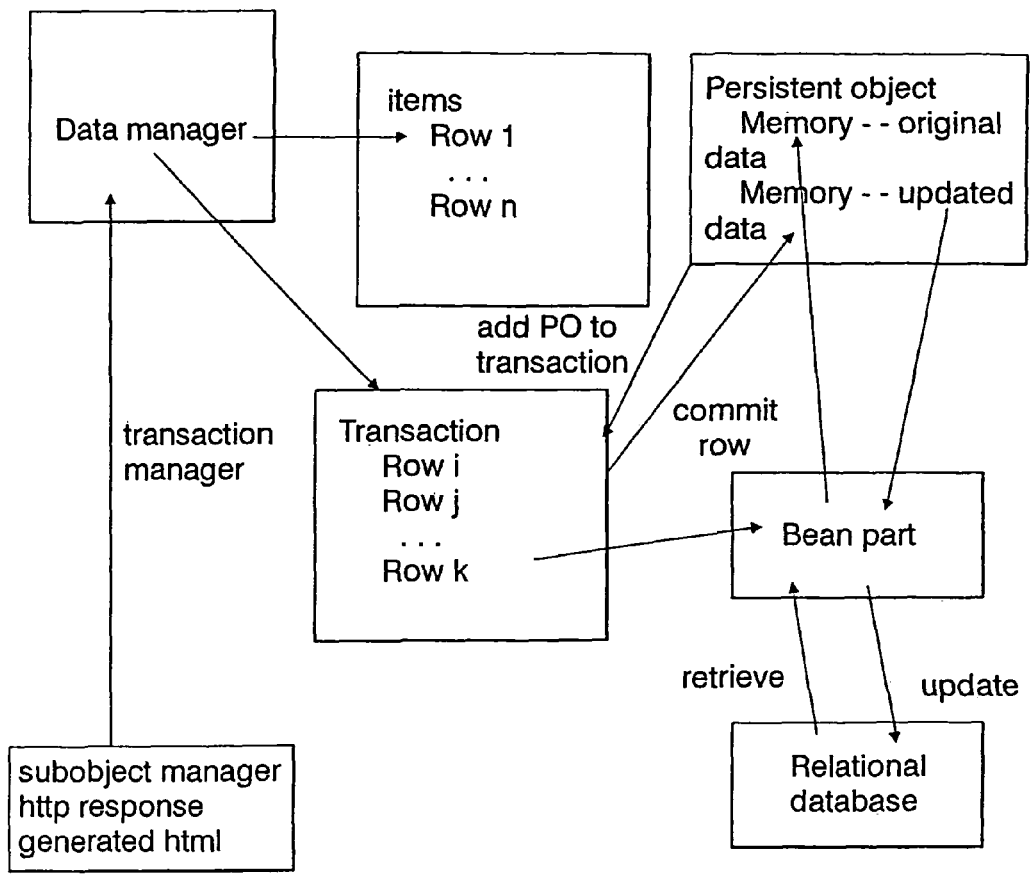
FIG. 22 shows a data manager class.

Unit of work controlled is handled by the data manager class (EADPDAManager). With reference to FIG. 22, the data manager keeps as one of its attributes the current transaction, which is a list of the rows (instances of EADPPersistentObject) that have been updated in the current unit of work. If other data managers need to keep their processing within the same unit of work, their transaction manager is set to the controlling data manager for that unit of work, and they add their updated rows to that manager's transaction list.

When a persistent object is created, it uses its bean part (which can be a PersistenceBuilder bean or an EJB bean) to access data from the relational database. However, all this data is mapped into the memory of the persistent object in two data arrays, one for the data as it came from the database, and a second for the current state of data for that row (which may reflect updates from the client side). For a row that exists on the database, these two arrays will start out the same. For a new row, there will be no original data.

Any update to the row which will require a database update causes that row to be added to the transaction list. When the unit of work is committed, each row in the list is examined for the type of update (add, modify, or delete) that is required. The bean part is updated as needed from the data in the memory of the persistent object, and is used to make the database update. Note that the bean is used only twice during this process; once when the data is initially retrieved, and finally when all the data is committed. In between, all reference is to the data cached in the memory of the persistent object. This means that the initial retneval can be done using "read only" techniques. As far as the database is concerned, the unit of work cycle is very brief Oust the time when persistent objects are committed out of the transaction list). This approach is ideal for use in a clustered WebSphere environment because the transaction list and the memory data in the persistent object can be easily serialized so that state data can be preserved if the session changes servers on the cluster. The bean, which is not serializable, can be discarded after its first use and reconstituted (from its logical key information, which is serializable) when it is time to commit the transaction.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A method for interfacing between clients and servers of a distributed processing system, said method comprising the steps of: providing a server adapter layer to facilitate interactions between the clients and the servers, said server adapter layer including a mechanism to provide interactive conversational sessions, with each client session able to maintain multiple concurrent conversations;
one of the servers establishing a plurality of data managers, each of the data managers managing an associated set of data, and each of the data managers having a manager key for identifying said each of the data managers;
one of the clients sending to said one of the servers a request to initiate a session with said one of the servers;
said one of the servers using a session key to create a session with said one of the clients;
said one of the servers sending to said one of the clients the session key and a plurality of the manager keys;
said one of the clients maintaining a plurality of documents for storing the session keg and the manager keys, wherein each of the documents stores the session key and one of the manager keys; and
said one of the clients using the session key and the plurality of the manager keys to access separately the sets of data managed by the data managers and to handle multiple concurrent conversations with said one of the servers during said session, including said one of the clients sending further requests to said one of the servers, each of said further requests including the session keg and one of the manager keys.

2. A method according to claim 1, wherein said mechanism also provides a request document including a session key that identifies a user session, and upon receipt of the session key, one of the servers creates or finds a session.

3. A method according to claim 2, wherein within each user session, requests related to a particular set of data are kept together by placing a manager key in the request document.

4. The method according to claim 2, wherein:
the sending to said one of the servers includes said one of the clients sending the request document to said one of the servers; and
the sending to said one of the clients includes said one of the servers putting the session key and one of the manager keys in the request document, and sending the request document back to said one of the clients.

5. The method according to claim 2, wherein the manager key for one of the data managers is assigned to the request document when said one of the data managers is created; each of the data managers represents a different thread of processing and can be independently processed; the one of the clients operates multiple windows at the same time, where each of the windows corresponds to a different data manager within the same session.

6. A method according to claim 1, wherein each of the servers is allocated a given number of sessions.

7. A method according to claim 6, wherein, for each server, when said given number of sessions allocated to the server is exceeded, a check is made for any inactive sessions at the server, and the most inactive session at the server is discarded.

8. A method according to claim 1, wherein the conversations include transactions, the transactions are separated into series, and each of the series of the transactions is associated with a respective one unit of work, and whenever one of the transactions associated with one of the units of work is updated, all of the transactions associated with said one of the units of work are updated in the same way.

9. A system for interfacing between clients and servers of a distributed processing system, said system comprising:
a server adapter layer to facilitate interactions between the clients and the servers, said server adapter layer including a mechanism to provide interactive conversational sessions, with each client session able to maintain multiple concurrent conversations;
wherein each of the servers is configured for establishing a plurality of data managers, each of the data managers managing an associated set of data, and each of the data managers having a manager key for identifying said each of the data managers;
wherein each of the servers is configured for operating, in response to receiving a request from one of said clients to initiate a session with said each of the servers, for using a session key to create a session with said one of the clients, for sending to said one of the clients a plurality of the manager keys of the data managers established by said each of the servers;
said one of the clients maintaining a plurality of documents for storing the session key and the manager keys, wherein each of the documents stores the session key and one of the manager keys; and said one of the clients uses the session key and the plurality of the manager keys to access separately the sets of data managed by the data managers and thereby have multiple concurrent conversations with said one of the servers during said session, including said one of the clients sending further requests to said one of the servers, each of said further requests including the session key and one of the manager keys.

10. A system according to claim 9, wherein said mechanism also provides a request document including the session key that identifies a user session, and upon receipt of the session key, one of the servers creates or finds a session.

11. A system according to claim 10, wherein within each user session, requests related to a particular set of data are kept together by placing a manager key in the request document.

12. A system according to claim 9, wherein each of the servers is allocated a given number of sessions.

13. A system according to claim 12, wherein, for each server, when said given number of sessions allocated to the server is exceeded, a check is made for any inactive sessions at the server, and the most inactive session at the server is discarded.

14. A system according to claim 9, wherein the conversations include transactions, the transactions are separated into series, and each of the series of the transactions is associated with a respective one unit of work, and whenever one of the transactions associated with one of the units of work is updated, all of the transactions associated with said one of the units of work are updated in the same way.

15. A program storage device readable by machine, tangibly embodying a program of instructions executable by the machine to perform method steps for interfacing between clients and servers of a distributed processing system, said method comprising the steps of:
  providing a server adapter layer to facilitate interactions between the clients and the servers, said server adapter layer including a mechanism to provide interactive conversational sessions, with each client session able to maintain multiple concurrent conversations and
  one of the servers establishing a plurality of data managers, each of the data managers managing an associated set of data, and each of the data managers having a manager key for identifying said each of the data managers;
  one of the clients sending to said one of the servers a request to initiate a session with said one of the servers;
  said one of the servers using a session key to create a session with said one of the clients;
  said one of the servers sending to said one of the clients a plurality of the manager keys;
  said one of the clients maintaining a plurality of documents for storing the session key and the manager keys, wherein each of the documents stores the session key and one of the manager keys; and
  said one of the clients using the session key and the plurality of the manager keys to access separately the sets of data managed by the data managers and to handle multiple concurrent conversations with said one of the servers during said session, including said one of the clients sending further requests to said one of the servers, each of said further requests including the session key and one of the manager keys.

16. A program storage device according to claim 15, wherein said mechanism also provides a request document including a session key that identifies a user session, and upon receipt of the session key, one of the servers creates or finds a session.

17. A program storage device according to claim 16, wherein within each user session, requests related to a particular set of data are kept together by placing a manager key in the request document.

18. A program storage device according to claim 15, wherein each of the servers is allocated a given number of sessions.

19. A program storage device according to claim 18, wherein, for each server, when said given number of sessions allocated to the server is exceeded, a check is made for any inactive sessions at the server, and the most inactive session at the server is discarded.

20. A program storage device according to claim 15, wherein the conversations include transactions, the transactions are separated into series, and each of the series of the transactions is associated with a respective one unit of work, and whenever one of the transactions associated with one of the units of work is updated, all of the transactions associated with said one of the units of work are updated in the same way.

* * * * *